United States Patent
Wintermantel

(10) Patent No.: US 11,709,257 B2
(45) Date of Patent: Jul. 25, 2023

(54) RADAR SYSTEM WITH MONITORING OF THE FREQUENCY POSITION OF A SEQUENCE OF SIMILAR TRANSMISSION SIGNALS

(71) Applicant: Conti Temic microelectronic GmbH, Nuremberg (DE)

(72) Inventor: Markus Wintermantel, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/674,736

(22) Filed: Nov. 5, 2019

(65) Prior Publication Data
US 2022/0236406 A1 Jul. 28, 2022

Related U.S. Application Data

(63) Continuation of application No. PCT/DE2018/200037, filed on Apr. 9, 2018.

(30) Foreign Application Priority Data

May 5, 2017 (DE) ...................... 10 2017 207 607.0

(51) Int. Cl.
*G01S 13/931* (2020.01)
*G01S 7/35* (2006.01)
(Continued)

(52) U.S. Cl.
CPC ............ *G01S 13/931* (2013.01); *G01S 7/356* (2021.05); *G01S 7/4008* (2013.01); *G01S 13/343* (2013.01)

(58) Field of Classification Search
CPC ...... G01S 13/931; G01S 7/356; G01S 7/4008; G01S 13/343
(Continued)

(56) References Cited

U.S. PATENT DOCUMENTS 6,633,253 B2 * 10/2003 Cataldo ............... G01S 13/5244
342/25 R
7,643,595 B2 * 1/2010 Aweya ................. H03L 7/1075
375/376
(Continued)

FOREIGN PATENT DOCUMENTS

CN 101666873 A 3/2010
DE 102009016480 A1 10/2010
(Continued)

OTHER PUBLICATIONS

Mueller, Felix, et al, A Method for the Analysis of Ramp-Inherent Linearity Distortions in Automotive Radar Applications, GeMiC 2015, Mar. 16-18, 2015, pp. 217-220, ISBN 978-3-9812668-6-3, IMATeche.V., Ratingen, Germany.
(Continued)

*Primary Examiner* — Nuzhat Pervin

(57) ABSTRACT

A method for detecting the environment of a motor vehicle utilizing a radar system includes bringing about frequency modulation utilizing an oscillator and generating a sequence of transmission-frequency-modulated transmit signals, which each having the same nominal frequency profile, apart from a variation in frequency position. Received signals for object detection are evaluated. A one time-discrete signal per transmit signal is used which includes information about the frequency profile of the transmit signal and which is generated by sampling of an analog signal or by reading out of a free-running counter at predetermined points in time. These time-discrete signals are unnormalized by way of the transmit signals with regard to the position of their phase and/or their initial value.

7 Claims, 15 Drawing Sheets

(51) Int. Cl.
*G01S 7/40* (2006.01)
*G01S 13/34* (2006.01)

(58) Field of Classification Search
USPC .......................................................... 342/70
See application file for complete search history.

(56) References Cited

U.S. PATENT DOCUMENTS

| | | | | |
|---|---|---|---|---|
| 8,416,812 | B2* | 4/2013 | Radulescu | G04G 7/00 |
| | | | | 370/503 |
| 8,564,785 | B2* | 10/2013 | Newbury | G01J 3/453 |
| | | | | 356/451 |
| 9,107,586 | B2* | 8/2015 | Tran | A61B 5/7271 |
| 9,470,781 | B2* | 10/2016 | Hesse | G01S 13/38 |
| 9,531,395 | B2* | 12/2016 | Aweya | H03L 7/1976 |
| 10,009,191 | B2 | 6/2018 | Currivan | H04L 27/26134 |
| 2008/0061891 | A1 | 3/2008 | Hongo | |
| 2009/0033538 | A1 | 2/2009 | Winkler | |
| 2012/0001791 | A1* | 1/2012 | Wintermantel | G01S 7/023 |
| | | | | 342/109 |
| 2016/0124075 | A1* | 5/2016 | Vogt | G01S 13/536 |
| | | | | 342/13 |
| 2017/0115384 | A1 | 4/2017 | Loesch et al. | |
| 2017/0153316 | A1 | 6/2017 | Wintermantel | |
| 2018/0031688 | A1 | 2/2018 | Hesse et al. | |
| 2018/0267159 | A1 | 9/2018 | Wada et al. | |
| 2019/0265347 | A1* | 8/2019 | Wintermantel | H01Q 1/3283 |

FOREIGN PATENT DOCUMENTS

| | | | | |
|---|---|---|---|---|
| DE | 102012212888 A1 * | 1/2014 | ........... | G01S 13/343 |
| DE | 102014214498 A1 | 1/2016 | | |
| DE | 102015103149 A1 * | 9/2016 | ........... | G01S 13/343 |
| DE | 102015103149 A1 | 9/2016 | | |
| DE | 102016214808 A1 | 5/2017 | | |
| DE | 102019203760 A1 * | 9/2020 | ............. | G01S 13/93 |
| EP | 0499952 A1 * | 8/1991 | ............. | G01S 13/34 |
| EP | 0499952 A1 | 8/1992 | | |
| EP | 0499952 A1 * | 8/1992 | ............. | G01S 13/34 |
| EP | 1141744 B1 * | 9/2003 | ............... | G01S 7/35 |
| EP | 2507649 B1 * | 4/2015 | ............. | G01S 13/22 |
| EP | 2440949 B1 * | 1/2016 | ............. | G01S 13/34 |
| JP | H10213651 A | 8/1998 | | |
| JP | 2008298736 A | 12/2008 | | |
| JP | 2012522972 A | 9/2012 | | |
| JP | 2014062824 A | 4/2014 | | |
| JP | 6066015 B1 | 1/2017 | | |
| WO | WO-2010142267 A1 * | 12/2010 | ............. | G01S 13/34 |
| WO | 2015185058 A1 | 12/2015 | | |
| WO | 2015188987 A1 | 12/2015 | | |
| WO | 2016139306 A1 | 9/2016 | | |
| WO | WO-2016139306 A1 * | 9/2016 | ........... | G01S 13/343 |
| WO | 2017056287 A1 | 4/2017 | | |

OTHER PUBLICATIONS

International Search Report and Written Opinion dated Jul. 16, 2018 from corresponding International Patent Application No. PCT/DE2018/200037.

German Search Report dated Feb. 23, 2018 for corresponding German Patent Application No. 10 2017 207 607.0.

Japanese Office Action dated Jan. 11, 2022 for the counterpart Japanese Patent Application No. 2019-545925.

Chinese Office Action dated Feb. 28, 2023, for the counterpart Chinese Application No. 201880033406.6.

* cited by examiner

RADAR SYSTEM WITH MONITORING OF THE FREQUENCY POSITION OF A SEQUENCE OF SIMILAR TRANSMISSION SIGNALS

CROSS REFERENCE TO RELATED APPLICATION

This application is a continuation of International application No. PCT/DE2018/200037 filed Apr. 9, 2018, which claims priority to German patent application No. 10 2017 207 607.0, filed May 5, 2017, each of which is hereby incorporated by reference.

TECHNICAL FIELD

The technical field relates generally to a radar system for use for driver assistance systems in motor vehicles, and more particularly to a radar system and methods for analyzing and monitoring frequency position over a sequence of similar transmit signals.

BACKGROUND

Motor vehicles are increasingly equipped with driver assistance systems which use sensor systems to detect the surroundings and derive automatic vehicle responses from the traffic situation identified in this way and/or instruct, in particular warn, the driver. A distinction is drawn between comfort and safety functions.

The most important comfort function in ongoing development is FSRA (Full Speed Range Adaptive Cruise Control). The vehicle adjusts its own velocity to the desired velocity specified by the driver provided the traffic situation allows this, with the own velocity otherwise being automatically adapted to the traffic situation.

A wide range of safety functions are now available. One group of functions reduce the braking or stopping distance in emergency situations; the spectrum of corresponding driver assistance functions extends from automatic brake prefill to reduce brake latency, through improved brake assist systems (BAS+) to autonomous emergency braking. A further group comprises lane change functions: they warn the driver or intervene in steering if the driver wishes to make a dangerous lane change, i.e. if a vehicle is either located in the neighboring lane in the blind spot (BSD—"Blind Spot Detection") or is approaching rapidly from behind (LCA—"Lane Change Assist").

In the foreseeable future, the driver will however no longer merely be assisted, but rather the task of the driver will increasingly be performed autonomously by the vehicle itself, i.e. the driver will increasingly be replaced. This is known as autonomous driving.

For systems of the type described above, radar sensors are used, frequently also in conjunction with sensors from other technologies, such as for example camera sensors. Radar sensors have the advantage of operating reliably even under poor weather conditions and of being capable not only of measuring object distance but also directly the radial relative velocity thereof using the Doppler effect. Transmission frequencies of 24 GHz, 77 GHz, and 79 GHz are used.

As a result of the increasing functional scope and involvement of such systems, the requirements made of the sensors with regard to reliability are becoming ever greater. The radar image must correspond to reality, i.e. the object values, especially range, relative velocity and angle must be correct, no objects must be overlooked and no "ghost objects", which are not in reality there, must be reported.

A central element of radar sensors is modulation of the transmission frequency, so as to be able to measure range and relative velocity. The commonest type of modulation is frequency modulation, in particular linear frequency modification, wherein a sequence of similar linearly modulated transmit signals is often used. An incorrect frequency position (i.e. for example center frequency) of the individual transmit signals (e.g. through failure or malfunction of individual circuit parts or fundamental frequency instability or frequency drift) may result in the above-described errors, i.e. incorrectly measured object sizes, undetected objects and ghost objects. This could lead the driver assist function implemented with the radar system to function incorrectly; in the case of an emergency braking assist system, for example, unjustified emergency braking could be activated by ghost objects, would could lead to a rear-end collision by a following vehicle with serious and possibly fatal consequences.

DE 10 2016 214 808 describes an arrangement and a method for analyzing the profile of the frequency position over a sequence of similar transmit signals based on a period counter, which is initialized at the start of each transmit signal (i.e. is not free-running) and the values of which are read out at the end of each transmit signal. If the profile of the frequency position over the transmit signals deviates too greatly from the nominal profile, either corrective measures are applied or the driver assistance system is partly or completely disabled. With the approach proposed therein, it should be taken into account that counters are difficult or complex to implement at high frequency (in particular the time-accurate read-out) and have high power consumption (also caused by the then relatively high counter length). The frequency of the counter can be reduced by upstream frequency division or frequency mixing. Upstream division has the disadvantage, however, that the accuracy of the frequency analysis decreases as the division factor increases, while upstream mixing requires the generation of a further signal in the high frequency domain and thus significant effort.

SUMMARY

The problem addressed by the disclosure is that of proposing arrangements and methods for a radar system for analyzing the frequency position over a sequence of similar transmit signals which differ from the approaches described in the prior art and may be or are advantageous, depending on technological constraints and implementation aspects. In particular, methods are proposed which may either operate with large frequency division factors or do not involve counter reinitialization.

The advantages described herein result from the fact that monitoring of the frequency position of the radar system is made possible, so as, in the event of too great a deviation of the profile of the frequency position from the nominal profile, to be able either to apply corrective measures or to partly or completely disable the driver assistance system in order to avoid malfunctioning of the driver assistance system.

According to the one exemplary embodiment, a method for a radar system for detecting the environment of a motor vehicle and performing a driver assistance function and/or autonomous driving maneuvers has the following steps: bringing about frequency modulation by means of an open- or closed-loop-controllable oscillator, generating a sequence of $K_0$ ($K_0>1$) transmission-frequency-modulated transmit signals, which each have the same nominal frequency profile, optionally apart from a variation in frequency position, i.e. in particular a variation in the initial and thus synonymously the center frequency, emitting transmit signals by means of transmission means, receiving transmit signals reflected from objects by means of receiving means, analyzing the frequency position of the transmit signals and evaluating the received signals, in particular for object detection, by means of signal processing means, wherein the actual profile of the frequency position arising over the K0 transmit signals, i.e. in particular the actual profile of the initial, center or medium frequency of the transmit signals, or the deviation thereof from the nominal profile brought about for example by frequency instability or frequency drift is determined absolutely or relatively, i.e. except for an indeterminate constant component, wherein, per transmit signal, one time-discrete signal is used which in each case contains information about the frequency profile of the transmit signal and which is preferably in each case generated by sampling of an analog signal or by reading out of a free-running counter at predetermined points in time, these time-discrete signals are unnormalized by way of the $K_0$ transmit signals with regard to the position of their phases and/or their initial values, and during an evaluation of these time-discrete signals normalization explicitly takes place or an influence of the position of their phase and/or their initial value is implicitly eliminated, and, depending on an actual profile determined in this way and/or a deviation determined in this way of the actual profile from the nominal profile of the frequency position and/or a quality measure derived therefrom, correction in the driving of the oscillator and/or correction in the evaluation of the received signals and/or adaptation of the driver assistance function and/or the autonomous driving maneuver function up to and including disabling thereof are performed.

The method for a radar system according to one exemplary embodiment may moreover be configured as follows: a signal is used for analysis which is reduced in frequency relative to the transmit signal by frequency division by a factor of T>1 and/or by mixing, these low-frequency signals arising from the transmit signals are optionally sampled after filtering, from these sampled signals arising from the transmit signals a complex value is determined optionally after further filtering in each case in one or more time intervals per transmit signal, in particular in that sampled values of the respective interval are corrected at least approximately by the expected phase advance, which results from the local nominal frequency profile of the transmit signals, and these phase-corrected sampled values are accumulated per interval, wherein the time interval(s) preferably have at least approximately the same position over the K0 transmit signals, and the actual profile of the frequency position over the K0 transmit signals or the deviation thereof from the nominal profile is characterized by means of the complex values determined in this way, in particular on the basis of the phase angle of these values, for which reason they are hereinafter also known as phase characteristic values.

In one exemplary embodiment, the method for a radar system in which the sampled signals are real-valued and in the time intervals considered are converted at least approximately into their analytical signals, i.e. the complex-valued signals with only the positive or negative frequency components, wherein to this end first level Hilbert filters are preferably used with the zero point at about the negative or positive of the respective center frequency of these frequency-modulated signal portions.

In one advantageous configuration, in the method for a radar system a scalar product may be obtained between the sampled values and a preferably precalculated parameter vector by the Hilbert filtering and the accumulation of the phase-corrected sampled values over the respective time interval.

In one exemplary embodiment of the method for a radar system, the phase difference respectively of pairs of phase characteristic values may be formed, wherein the two values of each pair in each case belong to time intervals of similar positions over the transmit signals and in each case the same time period and same frequency profile is at least approximately present between the two time intervals, and the profile of the frequency position is determined absolutely or relatively, i.e. except for an indeterminate constant component, from these phase differences or the change therein over the transmit signals.

More preferably, in the method for a radar system the pairs of phase characteristic values may in each case be formed from the same transmit signal, wherein preferably the one value is formed from a time interval in the leading region of the transmit signals and the second value from a time interval in the trailing region of the transmit signals.

In a further configuration of the invention, in the method for a radar system the pairs of phase characteristic values may in each case be formed from different transmit signals, for example from successive transmit signals, wherein both values belong to time intervals of a similar position over the transmit signals.

In one advantageous configuration, in the method for a radar system the frequency of the emitted transmit signals may be linearly modulated, the signals received by reflection of the transmit signals from objects may be transferred into the low-frequency domain by mixing with a signal whose frequency corresponds to the instantaneous transmission frequency or differs therefrom by a constant factor, the low-frequency receive signals are sampled NA times in an equidistant grid, a first spectral analysis is formed in each case by way of these NA sampled values, in particular in the form of a discrete Fourier transform, in order thereby to be able in particular to perform a range measurement of the objects and a separation for simultaneous detection of a plurality of objects, and in each case a second spectral analysis, in particular using the discrete Fourier transform, is carried out at frequency interpolation points of the first spectral analysis which extends over all or a subset of the values arising at the respective frequency interpolation point during the K0 transmit signals, in order thereby in particular to be able to perform in particular a relative velocity measurement of the objects and a separation for simultaneous detection of a plurality of objects.

Preferably, in the method for a radar system the expected spectrum of the second spectral analysis of a target at a range r with the relative velocity zero may be determined from the determined actual frequency position over the K0 transmit signals, the resultant spectrum or its magnitude may be used directly to derive a quality measure and/or a quality measure may be derived from the deviation of the spectrum from the expected spectrum of a target at the range r with the relative velocity zero, wherein for both spectral analyses the same window function is used and the resultant spectra are related at one and the same level for comparison purposes.

More preferably, in the method for a radar system it is possible to derive from a quality measure whether detection could have arisen from another detected object through deviation of the actual frequency position over the K0 transmit signals from the nominal frequency position, and this detection could then optionally be wholly discarded or identified as a potential apparent detection.

In one advantageous configuration, in the method for a radar system, by way of the difference between nominal and actual profile of the frequency position, a regression may be carried out and the parameters of the compensating function and/or the deviation, in particular the standard deviation, between actual profile and compensating function, may be used as the quality measure.

Preferably, in the method for a radar system a deviation from the actual to the nominal profile of the frequency position may be corrected directly or after performance of a regression by multiplication by a complex unit vector between first and second spectral analyses, wherein the phase of the complex unit vector is proportional to this deviation and proportional to the frequency of the respective frequency interpolation point of the first spectral analysis.

More preferably, in the method for a radar system the center frequency of the transmit signals or their deviation from the nominal center frequency may be determined and used for calculation of the relative velocity and/or the angular position of objects.

According to the one exemplary embodiment, a radar system is set up to carry out a method according to a preceding preferred configuration.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
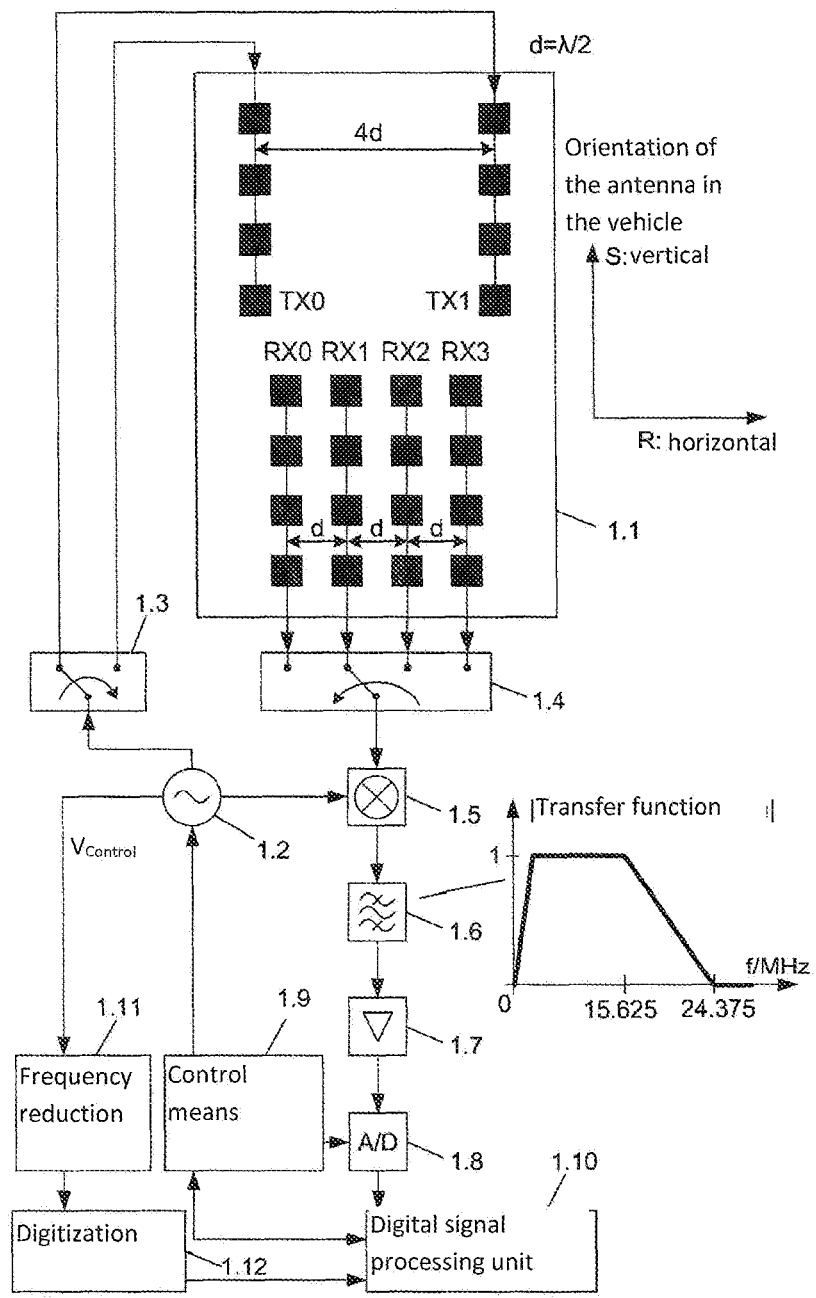
FIG. 1 shows an exemplary embodiment of a radar system.

The exemplary embodiment of a radar system depicted roughly in FIG. 1 is considered. The radar system has two transmit antennas TX0 and TX1 for emitting transmit signals and four receive antennas RX0-RX3 for receiving transmit signals reflected from objects. The antennas are fabricated as patch antennas on a flat printed circuit board 1.1 using planar technology, wherein this printed circuit board is oriented in the vehicle as depicted in the figure with regard to the horizontal and vertical directions. All antennas (transmit and receive antennas) in each case have the same radiation characteristics in elevation and azimuth. The four receive antennas (and thus their phase, i.e. emission, centers) each have the same lateral, i.e. horizontal distance d=$\lambda$/2=6.2 mm from one another, wherein $\lambda$=c/24.15 GHz=12.4 mm is the average wavelength of the emitted signals; the horizontal distance between the two transmit antennas is 4 times as great, i.e. 4d=2$\lambda$.

In each case one of the two transmit antennas and one of the four receive antennas may be selected using multiplexers 1.3, 1.4.

The transmit signals emitted on the respectively selected transmit antenna are derived from the high-frequency oscillator 1.2 in the 24 GHz domain, the frequency of which may be modified via a control voltage $v_{Control}$. The control voltage is produced in the control means 1.9, wherein these control means for example include a phase-locked loop or a digital/analog converter, which are driven such that the frequency profile of the oscillator corresponds at least approximately to the desired frequency modulation. To analyze the oscillator frequency, the latter is reduced in the circuit block 1.11 (by division and/or mixing) and the resultant signal is digitized in the circuit block 1.12—two different approaches to digitization are considered further below, on the one hand an analog/digital converter and on the other hand a counter. Evaluation of this digital information about the oscillator frequency proceeds in the digital signal processing unit 1.10.

The signals received by the respectively selected receive antenna are likewise mixed down in the real-valued mixer 1.5 with the signal of the oscillator 1.2 into the low-frequency domain. Then the receive signals pass through a bandpass filter 1.6 with the depicted transfer function, an amplifier 1.7 and an analog/digital converter 1.8; they are then further processed in the digital signal processing unit 1.10.

Figure 2:
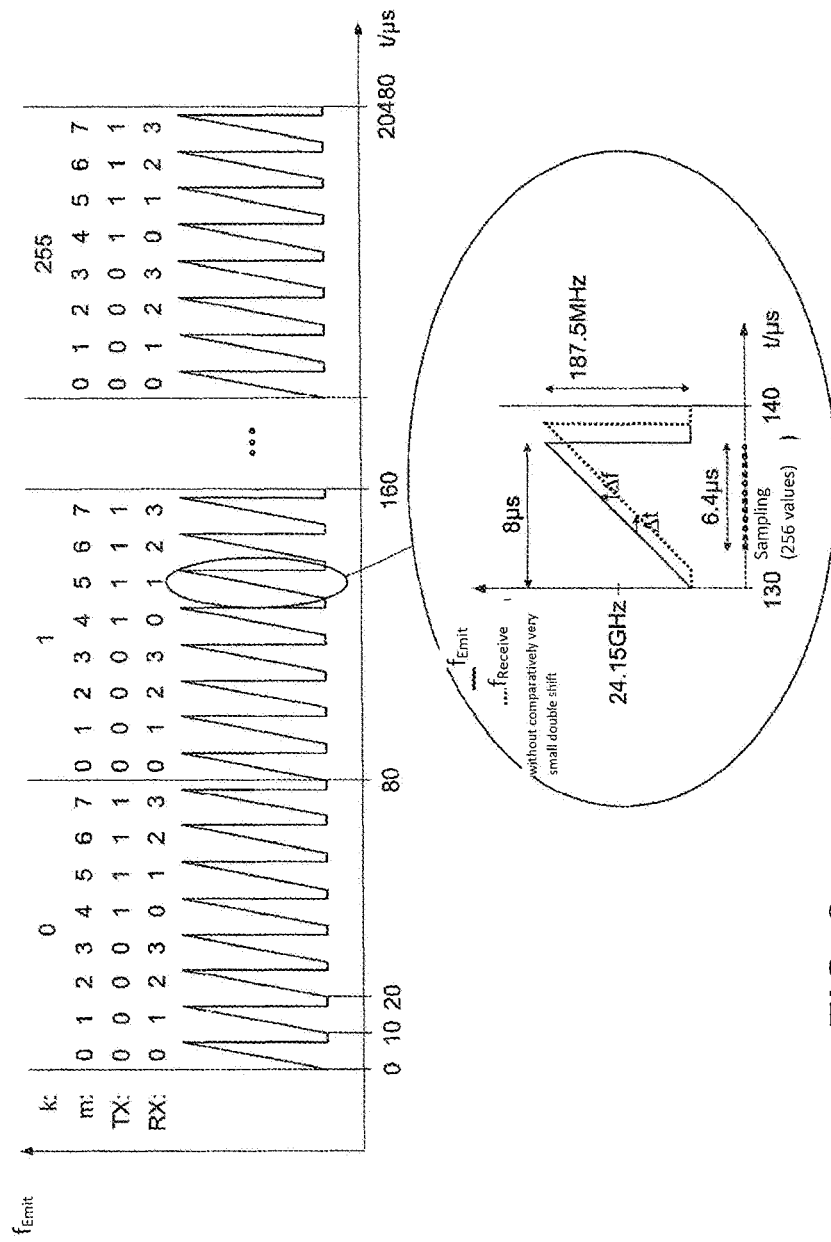
FIG. 2 shows the frequency of the transmit and receive signals which include "frequency ramps", and the antenna combinations used in each case and including transmit and receive antennas, according to one exemplary embodiment.

To be able to measure the range of objects, the frequency of the high-frequency oscillator and thus of the transmit signals, as depicted in FIG. 2, is modified very rapidly in linear manner (by 187.5 MHz in 8 µs, wherein the center frequency amounts to 24.15 GHz); this is known as a frequency ramp. The frequency ramps are repeated periodically (every 10 µs); overall, there are 2048 frequency ramps, which all have the same nominal frequency profile. The eight combinations of the two transmit and four receive antennas are periodically repeated over the frequency ramps in the sequence TX0/RX0, TX0/RX1, TX0/RX2, TX0/RX3, TX1/RX0, TX1/RX1, TX1/RX2 and TX1/RX3, wherein prior to each frequency ramp the respective next combination is selected. In FIG. 2, k is the running variable over the 2048/8=256 frequency ramps for each antenna combination and m=4·$m_{TX}$+$m_{RX}$ is the running variable over the eight antenna combinations $TXm_{TX}$/$RXm_{RX}$.

After mixing and thus also at the A/D converter for each frequency ramp and each of the eight antenna combinations, the receive signal of an individual punctiform object is a sinusoidal oscillation. This may be explained as follows with reference to FIG. 2: if the object has the radial relative velocity zero relative to the radar system, the frequency difference Δf between transmitted signal and received signal is constant and at the same time proportional to the signal propagation time Δt and thus proportional to the radial range r=c·Δt/2, wherein c is the velocity of light and the factor ½ takes into consideration the fact that the propagation time Δt relates to the wave round trip. The frequency difference Δf leads, in the case of the above layout, to Δf=2r/c·187.5 MHz/8 µs=r·156.250 kHz/m. Since the received signal is mixed in real-valued manner with the oscillator and thus transmission frequency, a sinusoidal oscillation with the frequency Δf arises downstream of the mixer. This frequency lies in the MHz domain and is shifted again, in the case of a non-vanishing radial relative velocity, by the Doppler frequency, which however only lies in the kHz domain and is therefore approximately negligible relative to the frequency component resulting from the object range. If there is a plurality of objects, the receive signal is a superimposition of a plurality of sinusoidal oscillations of different frequencies.

During each frequency ramp, the receive signal at the A/D converter is sampled 256 times in each case with a spacing of 25 ns (i.e. every 40 MHz) (see FIG. 2), wherein the sampling always begins at the same point in time relative to the start of the ramp. As is apparent from FIG. 2, signal sampling only makes sense in the time domain in which receive signals from objects in the range domain of interest are received—after the ramp start, at least the propagation time corresponding to the range of maximum interest has thus to be awaited (in the case of a range of maximum interest of 99 m, this corresponds to 0.66 µs). It should be noted that here and hereinafter range is always understood to mean radial range.

Figure 3:
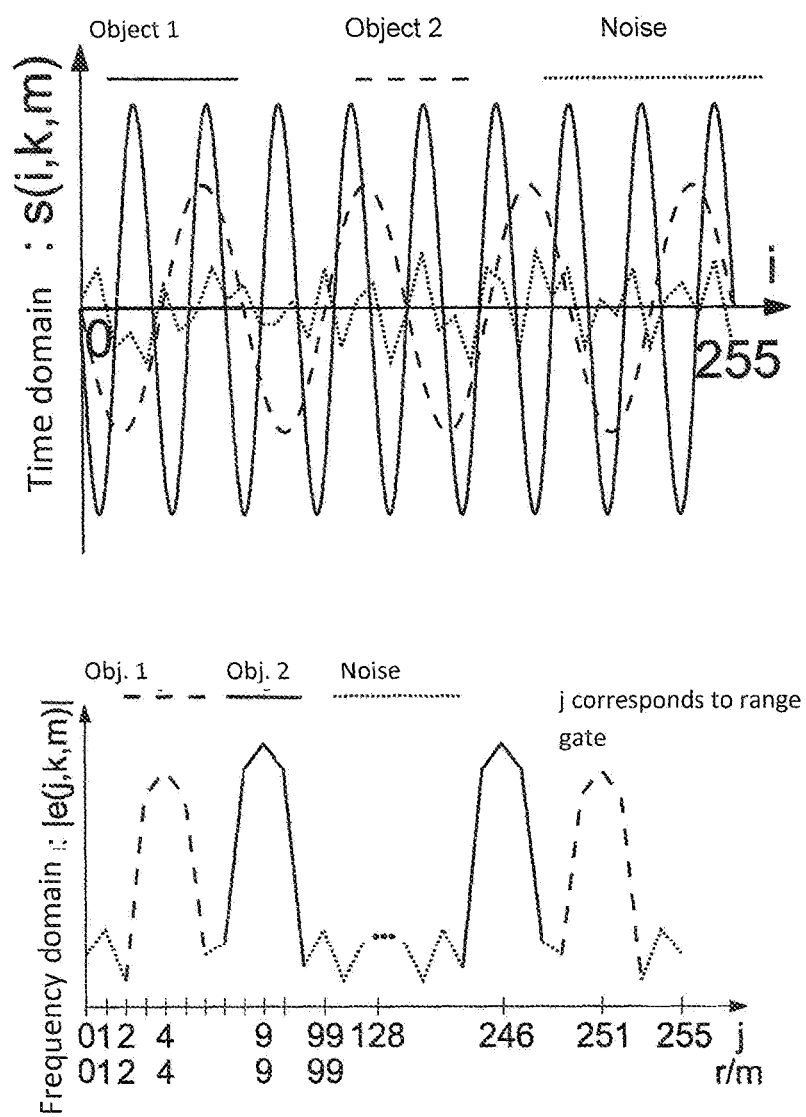
FIG. 3 shows a sampled signal in the presence of two objects prior to the first discrete Fourier transform ("DFT") (left) and after the first DFT (right), according to one exemplary embodiment.

In one exemplary embodiment, a discrete Fourier transform ("DFT") in the form of a fast Fourier transform ("FFT") is formed over the 256 sampled values of each frequency ramp. In this way, objects at different ranges, which lead to different frequencies, may be separated (see FIG. 3; left: signal s(i,k,m) prior to DFT in the presence of two objects, right: magnitude|e(j,k,m)| of result of DFT; here k is the running variable over the frequency ramps per antenna combination and m is the running variable over the eight antenna combinations $TXm_{TX}$/$RXm_{RX}$). Each of the discrete frequency interpolation points j of the DFT corresponds to a range r and may therefore also be designated, in a manner similar to pulse radars, as a range gate. In the case of the above configuration, the range gates have precisely a range and thus a width Δr of one meter (results from Δr·156.250 kHz/m=1/(6.4 µs)). In the range gates in which objects are located, power peaks arise in the DFT. Since the sampled receive signals are real-valued (in which case there is no additional information in the upper half of the DFT, since symmetrical) and the upper transition domain of the bandpass filter 1.6 according to FIG. 1 has a frequency bandwidth of 8.75 MHz (corresponds to the domain of 56 frequency interpolation points), only 100 of the 256 discrete frequency interpolation points can be further processed (it should be noted that arbitrarily narrow filter transition domains cannot be achieved). The filter 1.6 damps small frequencies and thus the receive signals of near objects, in order to avoid overdrive of the amplifier 1.7 and of the A/D converter 1.8 (the signals received at the antennas are indeed stronger as the object distance decreases).

Figure 4:
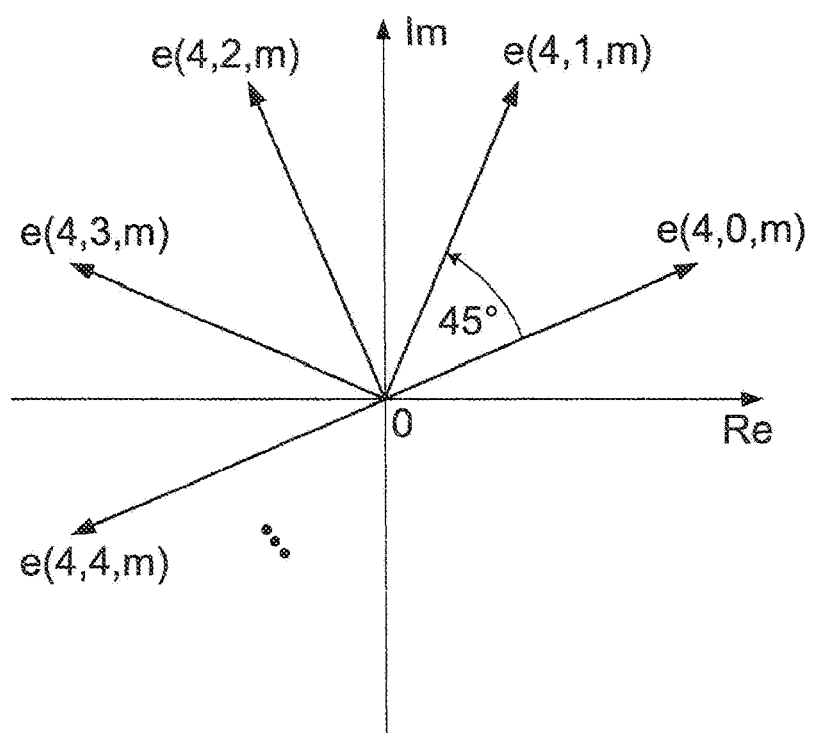
FIG. 4 shows the complex spectral value rotating over the frequency ramps in the range gate 4, in which exactly one object is present, according to one exemplary embodiment.

Over the 256 frequency ramps (k=0, 1, . . . , 255) in each of the eight antenna combinations m (m=0, 1, . . . , 7) for each range gate j (i.e. each of the 100 frequency interpolation points considered) complex spectral values e(j,k,m) arise. If there is precisely one object at the range corresponding to a range gate, the complex spectral value rotates in this range gate j over the 256 frequency ramps of each of the eight antenna combinations m=0, 1, . . . , 7 with the Doppler frequency, since the range (in the mm domain or below) and thus the phase angle of the associated oscillation changes uniformly from frequency ramp to frequency ramp (see FIG. 4; the phase change depicted therein of 45° per frequency ramp corresponds to a reduction in the range of the object of λ/(8.2)=0.78 mm, wherein the wavelength is λ=c/24.15 GHz=12.4 mm and the factor 2 in the denominator takes into consideration the wave round trip, from which the radial relative velocity $v_{rel}$=−0.78 mm/80 µs=35 km/h results; a positive sign of the radial relative velocity is defined as becoming more distant). A plurality of objects with different radial relative velocities in the same range gate are separated in that, for each antenna combination and each range gate over the complex spectral values arising in the 256 frequency ramps, a second DFT is calculated. Each discrete frequency interpolation point l of this second DFT corresponds to a set of Doppler frequencies (owing to the sampling of the Doppler frequency it can only be determined up to an unknown integral multiple of the sampling frequency thereof) and thus a set of radial relative velocities $v_{rel}$ of objects, such that the discrete frequency interpolation points of the second DFT may be denoted relative velocity gates; for the radial relative velocity the adjunct "radial" is hereinafter omitted for the sake of linguistic simplicity. The uniqueness domain of the relative velocity results from 2·$v_{rel,EB}$·80 µs=12.4 mm to yield $v_{rel,EB}$=280 km/h. The relative velocities $v_{rel}$=(1/256+p)·280 km/h are thus assigned to the relative velocity gate 1, wherein p is integral.

The second DFT serves not only to determine the relative velocity, but also increases detection sensitivity through integration thereof—in the case of 256 frequency ramps by about 10·$\log_{10}$(256)=24 dB.

Figure 5:
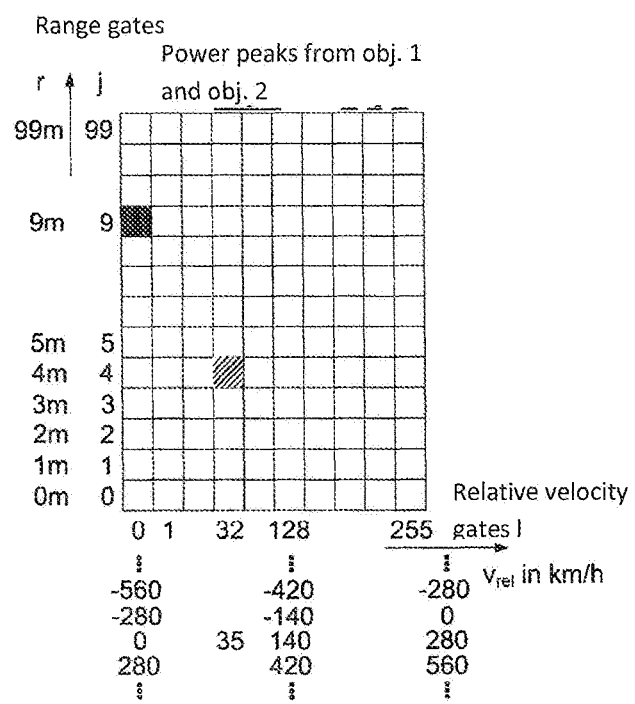
FIG. 5 is a schematic diagram of the two-dimensional complex-valued spectrum e(j,l,m) after the second DFT for an antenna combination m, according to one exemplary embodiment.

After this second DFT for the relative velocities, a two-dimensional complex-valued spectrum v(j,l,m) arises for each antenna combination m, wherein the individual cells may be denoted range/relative velocity gates and, as a result of objects, power peaks occur at the respectively associated range/relative velocity gate (see FIG. 5).

Figure 6:
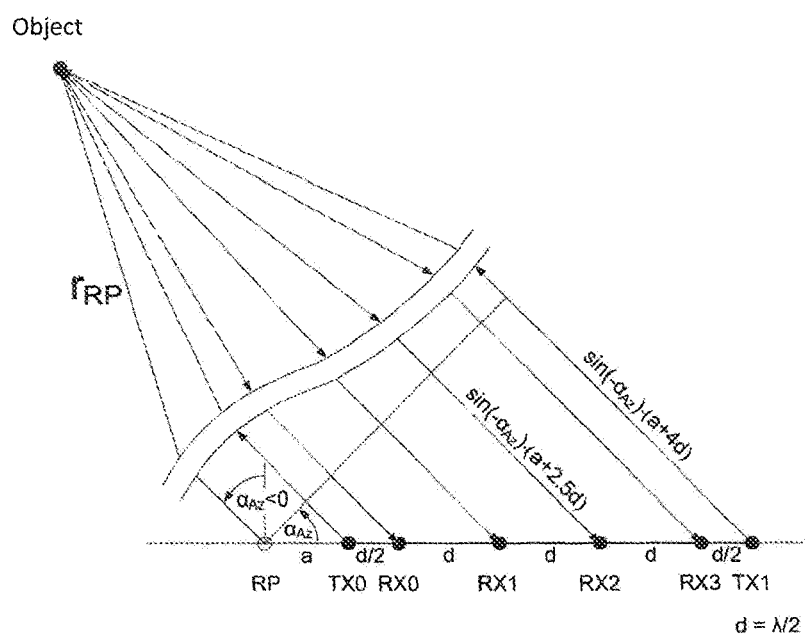
FIG. 6 shows the different path lengths between the individual antennas and a very remote object stationary relative to the sensor at an azimuth angle $\alpha_{Az}$<0, according to one exemplary embodiment.

Finally, the information from the eight antenna combinations is then merged. The waves originating from the two transmit antennas and reflected from an individual punctiform object arrive at the four receive antennas with different phase angles relative to one another, depending on the azimuth angle $\alpha_{Az}$, since the ranges between object and transmit and receive antennas are slightly different. This is now explained in greater detail, wherein the object under consideration is initially intended to be stationary relative to the sensor, i.e. it has the relative velocity zero. FIG. 6 depicts in vertical projection the phase centers of the antennas and the beam paths to a very distant object stationary relative to the sensor with the azimuth angle $\alpha_{Az}<0$ (positive $\alpha_{Az}$ means to the right of the soldering surface to the board plane) and elevation angle $\alpha_{El}=0$ (in the horizontal solder surface to the board plane); the object is far enough away for it to be possible to assume the beam paths to be parallel, i.e. the object is located in the far field of the antenna arrangement. The path length r(m) for the antenna combination $m=4 \cdot m_{TX} + m_{RX}$ from the transmit antenna $TXm_{TX}$ to the object and back to the receive antenna $RXm_{RX}$ results in $$r(m)=2 \cdot r_{RP}+\sin(-\alpha_{Az}) \cdot (a+m_{TX} \cdot 4d+a+d/2+m_{RX} \cdot d)$$

$$=2 \cdot r_{RP}+\sin(-\alpha_{Az}) \cdot (2a+d/2+m \cdot d),$$

wherein $r_{RP}$ is the path length from a reference point RP on the antenna board to the object and a the horizontal distance between reference point and transmit antenna TX0. It is clear from this relationship that the distance changes in linear manner with the number m of the antenna combination. The quantity $(2a+d/2+m \cdot d)$ represents the horizontal distance of the "relative phase center" of the antenna combination m to the reference point RP and is the sum of the horizontal distance of the associated transmit and receive antenna to the reference point (the relative phase center of a combination of one transmit and one receive antenna is here defined as the sum of the two vectors from a reference point to the phase centers of the transmit and the receive antenna).

The phase difference $\varphi(m)-\varphi(0)$ between the receive waves for the antenna combination $m=0, 1, \ldots, 7$ and the antenna combination $m=0$ results, in the basis of the different path lengths r(m), in $$\varphi(m) - \varphi(0) = -2\pi/\lambda \cdot [r(m) - r(0)]$$
$$= -2\pi/\lambda \cdot [2 \cdot r_{RP} + \sin(-\alpha_{Az}) \cdot (2a + d/2 + m \cdot d) -$$
$$2 \cdot r_{RP} - \sin(-\alpha_{Az}) \cdot (2a + d/2 + 0 \cdot d)]$$
$$= -2\pi/\lambda \cdot \sin(-\alpha_{Az}) \cdot d \cdot m = 2\pi/\lambda \cdot \sin(\alpha_{Az}) \cdot d \cdot m$$

and thus likewise changes in linear manner with the number m of the antenna combination. The amplitude of the signals received on the different antenna combinations is constant, since all the antennas have the same emission characteristics and the distance of the antennas from the very distant object differs only negligibly from a level point of view.

Figure 7A:
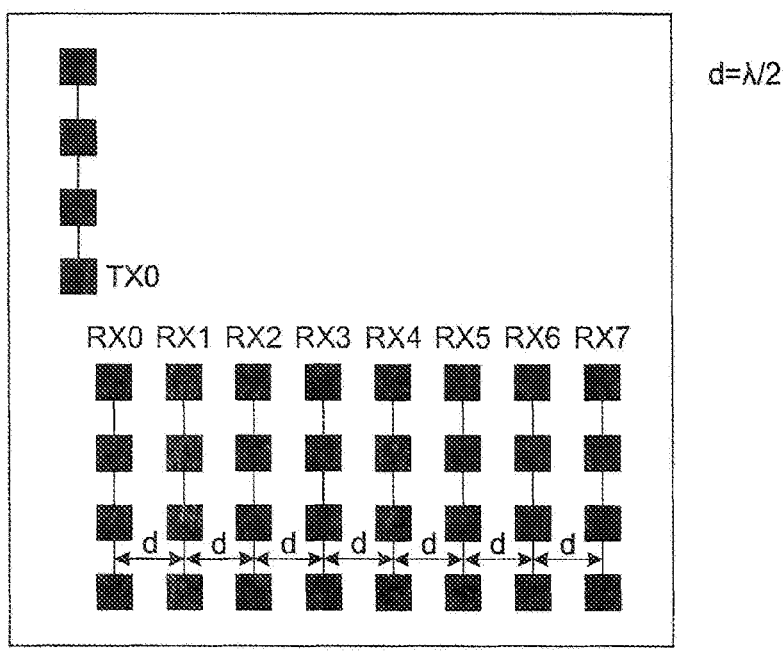
FIG. 7a shows an antenna arrangement with one transmit and 8 receive antennas, which is equivalent to the antenna arrangement considered according to FIG. 1 with two transmit and four receive antennas, according to one exemplary embodiment.
Figure 7B:
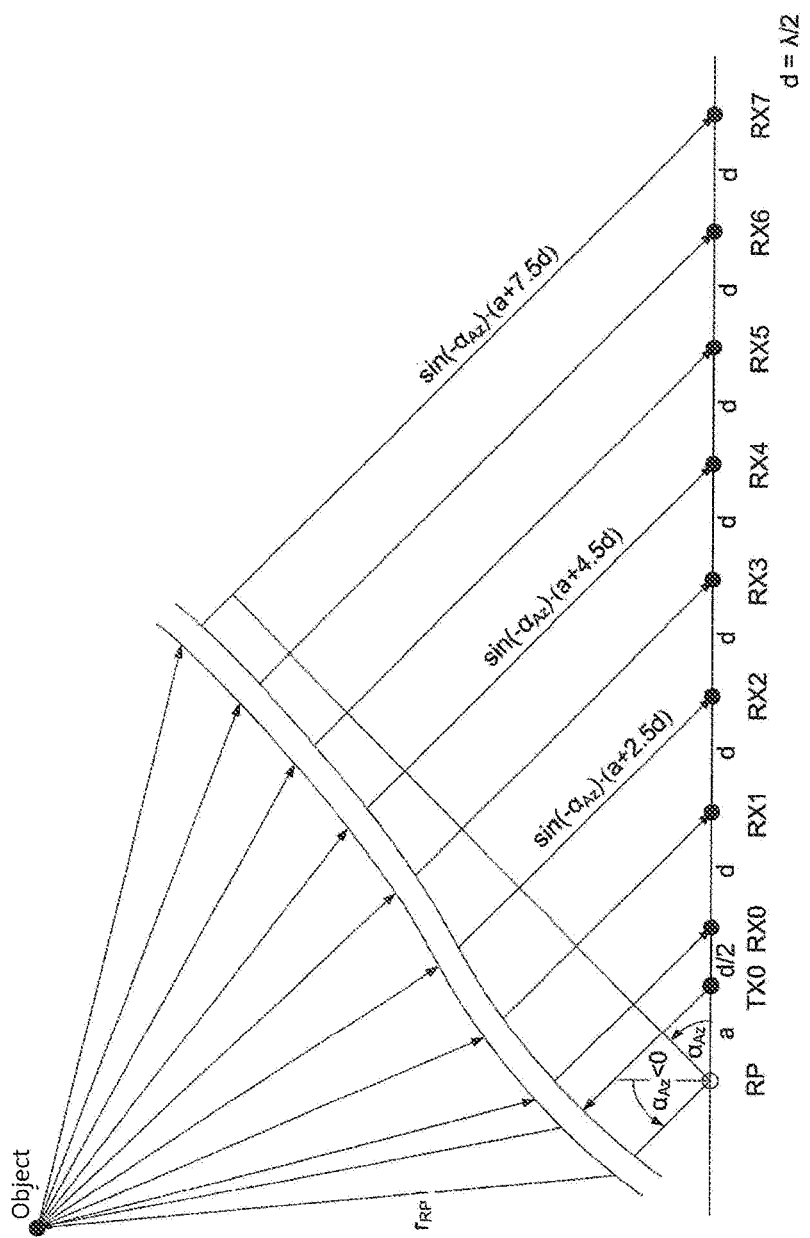
FIG. 7b shows the different path lengths between the individual antennas and a very remote object stationary relative to the sensor for this equivalent arrangement, according to one exemplary embodiment.

As is immediately apparent, in the case of the antenna arrangement depicted in FIG. 7a with vertical projection according to FIG. 7b, precisely the same relationships are obtained for the path length r(m) and the phase difference $\varphi(m)-\varphi(0)$ as in the case of the previously considered arrangement according to FIG. 1; the arrangement according to FIG. 7a has only one transmit antenna TX0 and 8 equidistant receive antennas RX0-RX7, wherein the antenna combination $m=m_{RX}$ is now formed from the transmit antenna and the receive antenna $RXm_{RX}$. Owing to the identical individual antennas and identical phase relationships of the antenna combinations to one another, the two antenna arrangements are equivalent with regard to angular position measurability. The arrangement presented here according to FIG. 1, however, has the advantage that it has virtually only half the horizontal extent compared with the conventional arrangement according to FIG. 7a, so allowing a significant reduction in sensor size.

Figure 8A:
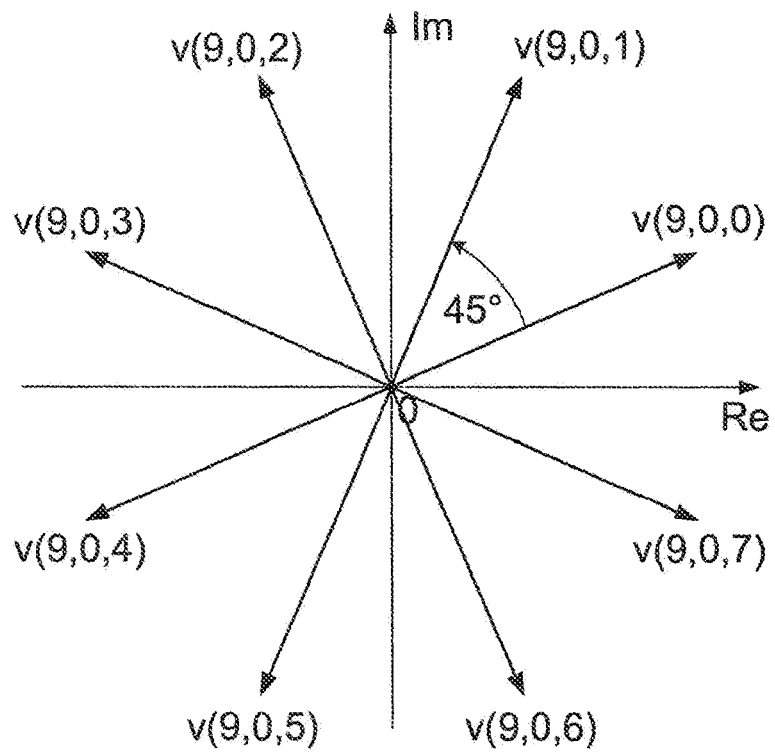
FIG. 8a shows for the above antenna arrangements the complex spectral value rotating over the antenna combinations in the range/relative velocity gate (9,0), in which exactly one object (stationary relative to the sensor) is present, according to one exemplary embodiment.
Figure 8B:
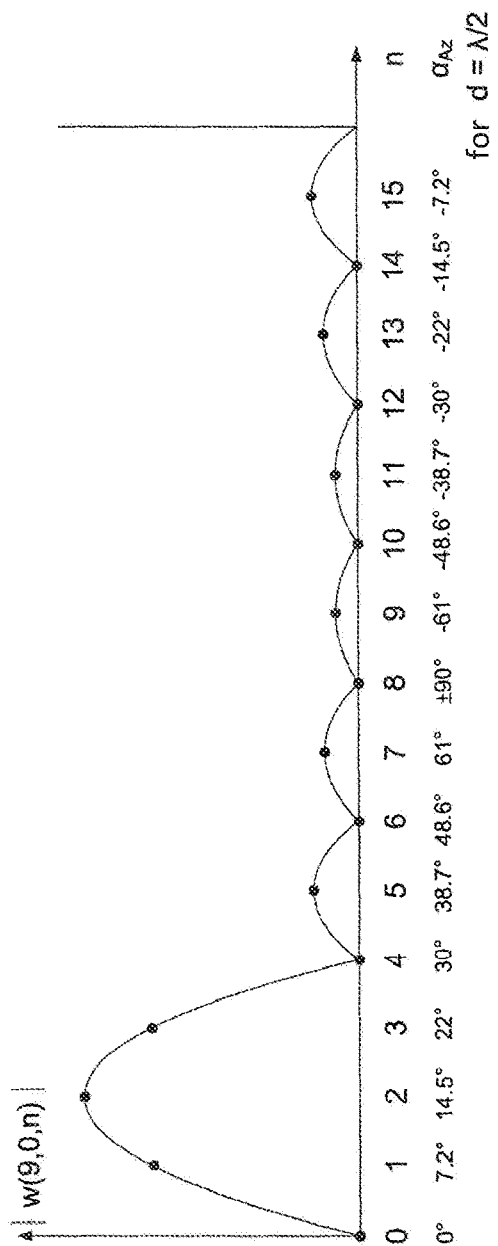
FIG. 8b shows the associated spectrum after the third DFT, in terms of magnitude, according to one exemplary embodiment.

The azimuth angle-dependent phase differences $\varphi(m)-\varphi(0)$ increasing or reducing in linear manner over the eight antenna combinations are maintained apart from possible constant and thus compensatable phase shifts (for example due to different line lengths) until after the second DFT; if there is therefore just one object in a range/relative velocity gate (j,l), the local complex spectral value v(j,l,m) rotates over the eight antenna combinations $m=0, 1, \ldots, 7$ with a constant velocity of rotation dependent on the azimuth angle (see by way of example FIG. 8a). Digital beam shaping for the azimuth direction may therefore be performed in each range/relative velocity gate. To this end, sums are formed over the complex values relating to the eight antenna combinations, which are each multiplied by a set of complex factors with a linearly changing phase; depending on the linear phase change of the respective factor set, radiation lobes result with different beam directions. The beam width of these radiation lobes is markedly less than that of the individual antennas. The above-described summation is achieved by a 16-point DFT, wherein the 8 values of the eight antenna combinations are supplemented by 8 zeros. The discrete frequency values $n=0, 1, \ldots, 15$ of this DFT correspond to different phase differences $\Delta\varphi=\varphi(m)-\varphi(m-1)=2\pi \cdot mods(n,16)/16$ between adjacent antenna combinations (mods(n,16) here denotes the symmetrical modulo, i.e. imaging onto the domain $-8 \ldots +8$) and thus to different azimuth angles $\alpha_{Az}=\arcsin(\Delta\varphi \cdot \lambda/(2\pi d))=\arcsin(mods(n \cdot 16) \cdot \lambda/(16d))$ and may therefore be denoted angle gates. FIG. 8b depicts the profile w(j,l,n), in terms of magnitude, of the spectrum of the third DFT for the conditions according to FIG. 8a, which relate to a punctiform object at the azimuth angle $\alpha_{Az}=14.5°$ (at the depicted phase difference between adjacent antenna combinations of 45°, which corresponds to $\pi/4$, $n=2$ and, for $d=\lambda/2$, the azimuth angle $\alpha_{Az}=\arcsin(\pi/4)=14.5°$). The third DFT serves not only to determine the azimuth angle, but also increases detection sensitivity through integration thereof—in the case of eight antenna combinations by about $10 \cdot \log_{10}(8)=9$ dB.

For determination of the azimuth angle, it has hitherto been assumed that the object has the relative velocity zero. If this is not the case, the phase between the receive signals to the two transmit antennas activated with a time offset of in each case 40 μs also additionally changes proportionally to the relative velocity hereinafter assumed to be constant, since the range changes in each case slightly during this period. Since every third DFT belongs to a range/relative velocity gate and thus to a determined relative velocity, the linear phase change over the eight antenna combinations generated by the relative velocity may be compensated either prior to or after the third DFT. In the event of compensation prior to the DFT, the phase of the complex input values has to be shifted, whereas in the event of compensation after the DFT, it is the discrete frequency values n belonging to the output values which have to be shifted. Due to the multiple values explained above for the relative velocity, this compensation leads to different azimuth angles depending on the hypothesis used for the multi-valued relative velocity.

Figure 9:
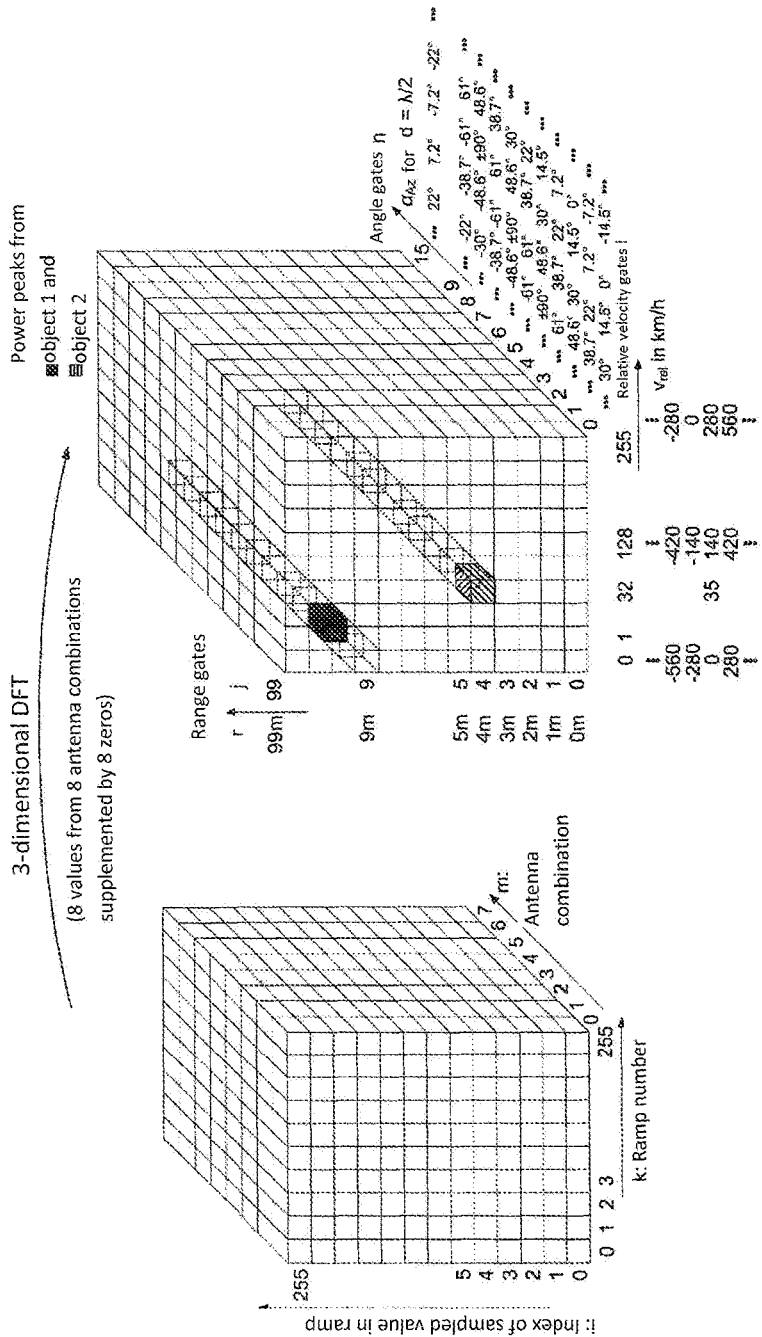
FIG. 9 is a schematic diagram of the data arrangement prior to the three-dimensional DFT (left) and the three-dimensional complex-valued spectrum w(j,l,n) thereafter (right), according to one exemplary embodiment.

After this third DFT for the azimuth angle (including compensation of the linear phase change over the antenna combinations generated by the relative velocity) a three-dimensional complex-valued spectrum w(j,l,n) arises, wherein the individual cells may be denoted range/relative velocity/angle gates and due to objects power peaks occur at the respectively associated range/relative velocity/angle gate (see FIG. 9; left: data arrangement prior to three-dimensional DFT, right: thereafter).

By determining the power peaks, objects may thus be detected and their measurements range, relative velocity (apart from possible multiple values, see above) and azimuth angle (one value corresponds to each multiple value hypothesis of relative velocity, see FIG. 9) established. Since power peaks determined by the DFT windowing also continue to have levels in neighboring cells, the object measurements may still be determined significantly more accurately by interpolation as a function of these levels than the gate widths. It should be noted that the window functions of the three DFTs are selected in such a way that on the one hand the power peaks do not become too wide (for satisfactory object separation), but on the other hand also the sidelobes of the window spectra do not become too high (so as also to be able to identify weakly reflective objects in the presence of highly reflective objects). From the height of the power peaks, the reflection cross-section thereof may be estimated as a fourth object measurement, which indicates how strongly the object reflects the radar waves. As a result of the noise present in every system (for example due to thermal noise), a certain power level results after the three-dimensional DFT even without received object reflections; this noise level, which varies to a given degree through random effects, constitutes the lower physical limit of detection capability. The detection threshold, above which objects are formed from power peaks, is placed at around 12 dB above average noise.

Hitherto, primary punctiform objects (i.e. extensive neither widthwise nor lengthwise) were observed with constant radial relative velocity and without lateral movement. The power peaks after the three-dimensional Fourier transform are then "sharp"; their shape corresponds to three-dimensional discrete Fourier transform of the window function shifted to the position of the three object variables velocity, range and angle, based respectively on one of the dimensions velocity, range and angle, the shape of the power peaks is the one-dimensional discrete Fourier transform of the respective window function shifted to the respective object variable. Objects for which the above conditions do not apply have "fuzzy" power peaks after the three-dimensional Fourier transform.

The described detection of objects and the determination of the associated object measurements constitute a measurement cycle and yield an instantaneous image of the environment; this is repeated cyclically around every 40 ms. To assess the environmental situation, the instantaneous images are tracked, filtered and evaluated over successive cycles; the reasons for this are in particular:

some variables cannot be determined directly in a cycle, but rather only from the change over successive cycles (e.g. longitudinal acceleration and transverse velocity), the movement of objects may be plausibility checked over a plurality of cycles, resulting in a more robust and reliable description of the environment; for example, the change in (radial) range occurring over successive cycles has to match the measured (radial) relative velocity, which results in redundancy and thus additional reliability of the environment description, and reduction of measurement noise by chronological filtering over a plurality of cycles.

The tracking and filtering of object detection over successive cycles is also known simply as tracking. In the process, values are predicted for the next cycle for each object from the tracked object measurements of the current cycle. These predictions are compared with the objects detected as a snapshot in the next cycle and the object measurements thereof in order to assign these correctly to one another. Then the predicted and measured object measurements belonging to the same object are merged, resulting in the current tracked object dimensions, which thus represent filtered values over successive cycles. If determined object measurements cannot be uniquely determined in one cycle, the various hypotheses must be taken into account during tracking. From the tracked objects and the associated tracked object measurements, the environment situation is analyzed and interpreted for the respective driver assistance function, so as to derive the corresponding actions therefrom.

It was explained above that, for punctiform objects with constant radial relative velocity and without lateral movement, after the three-dimensional Fourier transform "sharp" power peaks are obtained, the shape of which corresponds to the three-dimensional discrete Fourier transform of the window function shifted to the position of the three object variables velocity, range and angle, based in each case on one of the dimensions velocity, range and angle, the shape of the power peaks is here the one-dimensional discrete Fourier transform of the respective window function shifted to the respective object variable. This applies however only for an ideal circuit, in particular for ideal antennas and an ideal frequency modulation. In reality, a frequency modulation will never be perfect, for example due to physical noise effects such as thermal noise or through transient thermal or electrical phenomena or through finite accuracy in digital circuits and digital-analog transitions caused by quantization (for example by finite resolution of digital/analog converters for direct production of the oscillator control voltage or for settings for a phase-locked loop, i.e. a "PLL"). In addition to such inherent errors resulting from non-ideal circuits, markedly greater errors may also arise in frequency modulation due to failure or malfunction of individual circuit parts.

Hereinafter, consideration is only given to frequency modulation errors which lead over the sequence of transmit signals to a frequency position which deviates from the setpoint setting, wherein the frequency position of a transmit signal is characterized in particular by its center frequency. The linearity error of the frequency modulation (i.e. a deviation of the actual profile of the transmission frequency within the transmit signals from a linear regression with nominal gradient) is thus not considered, consideration instead being given to whether or how the frequency ramps are offset relative to one another; such an offset may is caused by slow frequency change, for example by low frequency supply voltage interference.

Such an erroneous frequency position (i.e. for example a varying center frequency with constant nominal center frequency) means that, even in the case of punctiform objects, the power peaks in relative velocity dimensions are vague or fuzzy, which may lead to incorrect measurement of relative velocity, the concealment of smaller objects by larger objects and the production of ghost objects. This could lead the driver assist function implemented with the radar system to function incorrectly; in the case of an emergency braking assist system, for example, unjustified emergency braking could be activated by ghost objects, would could lead to a rear-end collision by a following vehicle with serious and possibly fatal consequences.

It is therefore important for the quality of the frequency position to be permanently monitored and either for errors which occur to be corrected or for the driver assistance function to be optionally disabled.

To effect monitoring of the frequency position, first of all the case is considered of reducing the frequency of the oscillator signal in the circuit block 1.11 of FIG. 1 by division by a factor of T=2048 and then digitizing it in the circuit block 1.12 by a real-valued analog/digital conversion with the sampling rate $f_A$=40 MHz.

After division by the factor T=2048, a signal arises whose frequency lies in the domain (24.15 GHz±187.5/2)/2048=11.8 MHz±45.8 kHz—at each frequency ramp the frequency of the divided-down signal changes in linear manner from the lower to the upper value, i.e. by 91.6 kHz, provided the oscillator frequency corresponds to its nominal profile according to FIG. 1 with a constant linear gradient and a constant frequency position (i.e. constant initial and thus center frequency); if the starting time of the frequency ramp is defined in each case as t=0, the following applies for the divided-down frequency during each of the K=256 frequency ramps (k=0, 1, . . . , K−1) of each of the eight antenna combinations (m=0, 1, . . . , 7):

$$f_T(t,k,m)=f_{TM}+b_T\cdot(t-4\ \mu s)=f_{TS}+b_T\cdot t \text{ for } 0\le t\le 8\ \mu s,$$

with $f_{TM}$=11.8 MHz, $f_{TS}$=11.75 MHz and $b_T$=91.6 kHz/8 μs.

Figure 10:
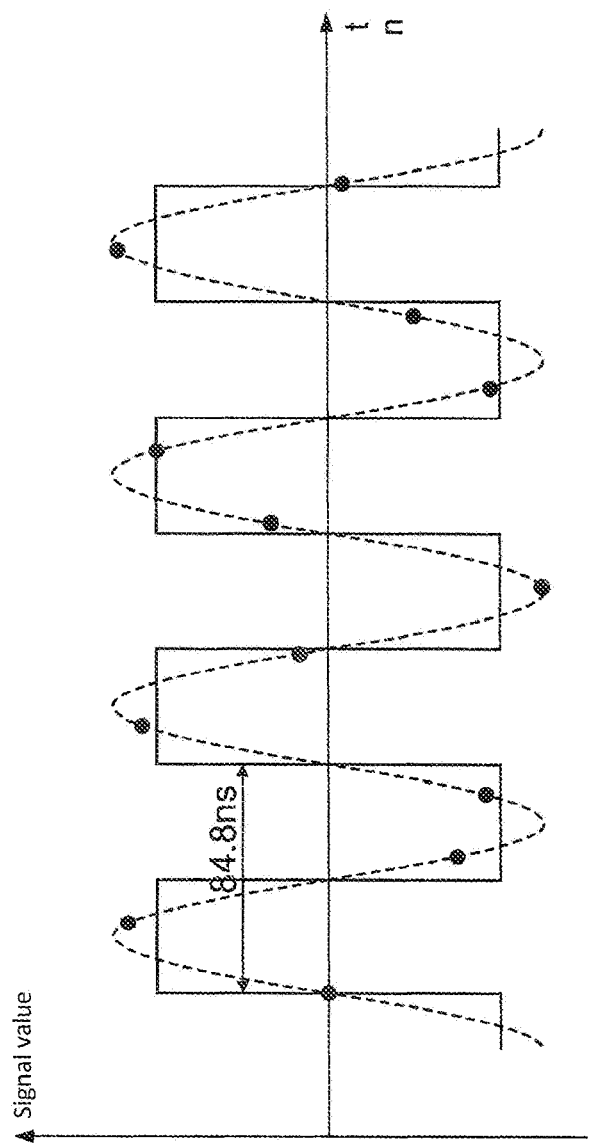
FIG. 10 shows a portion of the oscillator signal divided down by the factor T=2048 (continuous curve), the sinusoidal signal resulting therefrom after filtering (dashed curve) and the values thereof obtained after sampling (shown by dots), according to one exemplary embodiment.

Typically, the output signal of a divider has a rectangular profile; FIG. 10 depicts a portion (continuous curve). To achieve a sinusoidal profile, this signal is filtered with a low pass, which suppresses all the harmonics of the rectangular signal (the harmonics are located at uneven multiples of the respective fundamental frequency, i.e. around 3·11.8 MHz=35.4 MHz, 5·11.8 MHz=59 MHz, etc.); to this end, a typical anti-aliasing low pass may be used, the limit frequency of which lies at half the sampling frequency, i.e. 20 MHz. The sinusoidal signal which then arises is likewise depicted in FIG. 10 (dashed curve). The phase response $\varphi_T(t,k,m)$ of this sinusoidal signal $s_T(t,k,m)$ arises through integration of the divided-down frequency $f_T(t,k,m)$, such that the following applies:

$$s_T(t,k,m)=A_s\cdot\cos(\varphi_T(t,k,m))$$

with $\varphi_T(t,k,m)=2\pi\cdot[f_{TS}\cdot t+b_T/2\cdot t^2]+\varphi_0(k,m)$, wherein $\varphi_0(k,m)$ represents the phase at the respective ramp start (i.e. at t=0) and in general varies from frequency ramp to frequency ramp and $A_s$ is the amplitude of the signal.

After sampling of the sinusoidal signal $s_T(t,k,m)$ in the 25 ns grid (sampling rate $f_A$=40 MHz), the values likewise shown in FIG. 10 are obtained; for the sampled signal $s_{TA}(n,k,m)$ the following applies:

$$s_{TA}(n,k,m)=A_s\cdot\cos(2\pi\cdot[f_{TS}/f_A\cdot n+b_T/2/f_A^2\cdot n^2]+\varphi_0(k,m)).$$

All these $K_0$=2048 signals (one per frequency ramp) are further processed in digitized form in the digital signal processing unit 1.10, in order to determine therefrom the quality of the frequency position, which is explained hereinafter.

The above relationship for the sampled, divided-down signal $s_{TA}(n,k,m)$ indicates the ideal case, in which namely the actual profile of the frequency corresponds to the linear nominal profile with constant frequency position and no noise is superimposed on the signal, but this cannot in reality be assumed. In addition to a systematic linearity error not considered here, an error of frequency position and thus of initial or center frequency may in particular occur which varies over the frequency ramps (for example due to transient thermal effects or power supply disturbances); during one frequency ramp this error $\Delta f_E(k,m)$ is, in somewhat simplified manner, considered constant. In the sampled, divided-down signal this means an error smaller by the division factor T=2048

$$\Delta f_{ET}(k,m)=\Delta f_E(k,m)/T,$$

which is constant during a frequency ramp but varies from ramp to ramp. In addition, the real signal $s_{TA}(n,k,m)$ also bears a noise component $r(n,k,m)$, which arises for example due to phase noise from the oscillator and quantization effects in the case of A/D conversion. This then gives rise overall to the real signal $s_TA(n,k,m)$:

$$s_{TA}(n,k,m)=A_s\cdot\cos(2\pi\cdot[f_{TS}/f_A\cdot n+b_T/2/f_A^2\cdot n^2+\Delta f_{ET}(k,m)/f_A\cdot n]+\varphi_0(k,m))+r(n,k,m),$$

wherein $0\le n\le 8\ \mu s\cdot f_A$, i.e. $0\le n\le 320$.

In order to determine the frequency error $\Delta f_{ET}(k,m)$, the phase-frequency characteristic of the real signal $s_TA(n,k,m)$ can be compared with the phase-frequency characteristic expected for the nominal frequency profile. For this purpose, the real-valued signals $s_{TA}(n,k,m)$ firstly have to be converted into their corresponding complex-valued signal, i.e. into their analytical signal $s_{TAC}(n,k,m)$:

$$s_{TAC}(n,k,m)=A_s\cdot\exp(\underline{i}\cdot$$
$$(2\pi\cdot[f_{TS}/f_A\cdot n+b_T/2/f_A^2\cdot n^2+\Delta f_{ET}(k,m)/f_A\cdot n]+\varphi_0(k,m)))+r_C(n,k,m),$$

wherein $r_C(n,k,m)$ is the analytical signal of the noise $r(n,k,m)$ and has a much smaller amplitude than the useful component of the signal with amplitude $A_s$; $\underline{i}$ denotes the imaginary unit. An analytical signal arises through complex-valued filtering with an "ideal Hilbert filter", which suppresses all negative frequencies and passes all positive frequencies with a constant transmission factor of 1. In real filters, it is not possible to achieve an infinitely narrow transition domain between blocking in the case of negative frequencies and passing of positive frequencies. This is however also not necessary in the case of the present signal $s_{TAC}(n,k,m)$, since it only has relevant spectral components in a narrow domain around $+f_{TM}=\pm11.8$ MHz; therefore filtering with a complex-valued first level filter with a zero point at the frequency $-f_{TM}=-11.8$ MHz is sufficient. After this Hilbert filtering, approximately the analytical signal $s_{TAC}(n,k,m)$ arises according to the above formula, wherein the complex-valued noise $r_C(n,k,m)$ also contains components at negative frequencies, which do not, however, disrupt processing.

From the phases of the complex values $s_{TAC}(n,k,m)$ established by measurement and processing and the known parameters $f_{TS}$, $b_T$ and $f_A$, it is now possible to determine the phase response $$\varphi_{TEmeas}(n,k,m)=2\pi\cdot\Delta f_{ET}(k,m)/f_A\cdot n+\varphi_0(k,m)+\varphi_r(n,k,m),$$

wherein $\varphi_r(n,k,m)$ is the unknown phase noise component. If the phase difference is formed between two points in time (indices $n_1$ and $n_2$), this is described by $$\varphi_{TEmeas}(n_2,k,m)-\varphi_{TEmeas}(n_1,k,m)=2\pi\cdot\Delta f_{ET}(k,m)/f_A\cdot(n_2-n_1)+\varphi_r(n_2,k,m)-\varphi_r(n_1,k,m);$$

it should be emphasized that the start phase $\varphi_0(k,m)$, which generally varies over the ramps, is implicitly eliminated by difference formation. The frequency error $\Delta f_{Emeas}(k,m)$ determined by measurement is thus obtained by evaluation of the relationship $$\Delta f_{Emeas}(k,m)=(\varphi_{TEmeas}(n_2,k,m)-\varphi_{TEmeas}(n_1,k,m))\cdot T\cdot f_A/(2\pi\cdot(n_2-n_1)),$$

this measured frequency error $\Delta f_{Emeas}(k,m)$ differs from the actual frequency error $\Delta f_E(k,m)$ by the measurement error $$\Delta f_{EmeasE}(k,m)=(\varphi r(n_2,k,m)-\varphi_r(n_1,k,m))\cdot T\cdot f_A/(2\pi\cdot(n_2-n_1)).$$

So that this measurement error is as small as possible, widely spaced time points $n_1$ and $n_2$ should be selected, for example one at the ramp end ($n_2=320$) and the other at the start of the receive signal sampling period ($n_1=65$).

It should be noted that phases can only be determined precisely to integral multiples of $2n$, for which reason the determination of $\Delta f_{Emeas}(k,m)$ has to take place in modulo calculation with regard to $2\pi$ and the uniquely determinable domain of the frequency error amounts to "just" $T\cdot f_A/(n_2-n_1)$, which is however over 321 MHz in the previous example and thus far above the errors to be expected.

Strictly speaking, slow frequency drift results only in a change to center frequency, but also, within a frequency ramp, in very little distortion relative to the linear nominal frequency profile, which is however generally non-critical from a system standpoint. The frequency error $\Delta f_{Emeas}(k,m)$ determined by measurement then represents the average frequency error during a frequency ramp (apart from the measurement error $\Delta f_{EmeasE}(k,m)$).

In reality, small systematic frequency modulation linearity errors may occur (i.e. a deviation of the actual profile of the transmission frequency within the transmit signals from a linear regression with nominal gradient); one cause of this may be transient electrical effects. If, as in the above example the same points in time $n_1$ and $n_2$ are used to determine the phase difference at each frequency ramp, such systematic linearity errors do not have any influence on the determination of the frequency error $\Delta f_E(k,m)$; were different points in time to be used, this would no longer be the case, because the linearity error would lead to small changes in the measured average frequency error (the average frequency error then being dependent on the selected time interval $[n_1,n_2]$. It is therefore preferable for the same points in time $n_1$ and $n_2$ to be used for each frequency ramp.

With the above approach, the measurement error $\Delta f_{Emeas}E(k,m)$ caused by the phase noise $\varphi_r(n,k,m)$ may be markedly too great. An improvement may be achieved in that, at the beginning and end of the selected time interval $[n_1,n_2]$, in each case not just one of the phase error measured values $\varphi_{TEmeas}(n,k,m)$ is used, but rather a plurality thereof, in order better to average the phase noise. Direct averaging of the phase error measured values is unfavorable, however, since they are on the one hand unique only for multiples of $2\pi$ (sudden phase changes may thus arise) and since this would on the other hand be averaging in a nonlinear dimension, when considered from the point of view of signal theory. The phase error measured values $\varphi_{TEmeas}(n,k,m)$ are therefore better averaged indirectly over corresponding complex-valued unit vectors $\exp(i\cdot\varphi_{TEmeas}(n,k,m))$; such vectors are thus accumulated and the phase of the sum vector is then determined. If the useful component $2\pi\cdot\Delta f_{ET}(k,m)/f_A\cdot n$ of the phase error $\varphi_{TEmeas}(n,k,m)$ varies only slightly in the accumulation time interval (which is generally the case with the design under consideration) and the phase noise $\varphi_r(n,k,m)$ is uncorrelated over time n (which, to a good approximation, is also mostly the case), then on accumulation the influence of the phase noise is reduced over N values by the factor N with regard to power and the factor $\sqrt{N}$ with regard to amplitude. If in each case 64 values are used in the leading time interval and the trailing time interval, noise is effectively reduced by a factor of 64 with regard to power and a factor of 8 with regard to amplitude. It should however be considered that the spacing of the centers of the two time intervals reduces if only the interval $[n_1,n_2]=[65,320]$ continues to be used: if just one value was used in the two time intervals, the spacing $n_2-n_1=320-65=255$; if the leading time interval $n_1,\ldots,n_1+63$ and the trailing time interval $n_2-63,\ldots,n_2$ are used, the spacing reduces by 63 to 192. According to the above relationship for the measurement error $\Delta f_{EmeasE}(k,m)$, the factor $255/192=1.33$ is thereby lost with regard to amplitude and 1.76 with regard to power. By averaging, therefore, a reduction in noise by a factor of 36 with regard to power and a factor of 6 with regard to amplitude is achieved overall.

For averaging purposes, it is not necessary explicitly to determine the phase error measured values $\varphi_{TEmeas}(n,k,m)$, since only the phase vector $\exp(i\cdot\varphi_{TEmeas}(n,k,m))$ is of interest and the complex-valued signal $s_{TAC}(n,k,m)$ contains this phase vector (see corresponding relationships above); averaging can therefore be based on the complex-valued signal $s_{TAC}(n,k,m)$. To this end, however, the phase component $2\pi\cdot[f_{TS}/f_A\cdot n+b_T/f_A^2\cdot n^2]$ dependent on the nominal frequency profile must be eliminated in $s_{TAC}(n,k,m)$, which may be achieved by multiplication by the phase vector $\exp(-i\cdot 2\pi\cdot[f_{TS}/f_A\cdot n+b_T/f_A^2\cdot n^2])$ (a kind of frequency normalization is therefore performed):

$$s_{TACN}(n,k,m)=A_s\cdot\exp(i\cdot(2\pi\cdot\Delta f_{ET}(k,m)/f_A\cdot n+\varphi_0(k,m)))+r_{CN}(n,k,m);$$

it should be noted that the random characteristics of the noise $r_{CN}(n,k,m)$ do not change here, since values with an amplitude of 1 were used for multiplication. These signals are then accumulated in both time intervals and the "phase characteristic value" $P_1(k,m)$ is obtained in the leading time interval and $P_2(k,m)$ in the trailing time interval. Then, for each frequency ramp, the phase characteristic value $P_2(k,m)$ is multiplied by the conjugate complex of the phase characteristic value $P_1(k,m)$ and the phase of this value is determined, so resulting in the differential phase $\Delta \varphi_{TEmeas}(k,m)$ of the two phase characteristic values:

$$\Delta\varphi_{TEmeas}(k,m)=2\pi\cdot\Delta f_{ET}(k,m)/f_A\cdot(n_2-n_1-(N-1))+\Delta\varphi_r(k,m);$$

here, N is the number of values used for averaging per time interval and $\Delta\varphi_r(k,m)$ employs the unknown phase noise component, which is however now reduced by the averaging over the N values per time interval. It should be emphasized that the start phase $\varphi_0(k,m)$, which generally varies over the ramps, is again implicitly eliminated.

The frequency error $\Delta f_{Emeas}(k,m)$ determined by measurement is thus obtained by evaluation of the relationship $$\Delta f_{Emeas}(k,m)=\Delta\varphi_{TEmeas}(k,m)\cdot T\cdot f_A/(2\pi\cdot(n_2-n_1-(N-1))),$$

this measured frequency error $\Delta f_{Emeas}(k,m)$ differs from the actual frequency error $\Delta f_E(k,m)$ by the measurement error $$\Delta f_{EmeasE}(k,m)=\Delta\varphi_{TEmeas}(k,m)\cdot T\cdot f_A/(2\pi\cdot(n_2-n_1-(N-1))).$$

In the case of the above calculation of the phase characteristic values $P_1(k,m)$ and $P_2(k,m)$, the signal $s_{TAC}(n,k,m)$ was frequency-normalized by multiplication by a corresponding phase vector (i.e. the nominal frequency profile subtracted out) and then these values were accumulated per respective time interval. Multiplication and accumulation may be formulated or determined together in one step as a scalar product; the one vector in this case consists of the signal $s_{T4C}$(n,k,m) in the time interval under consideration, while the other consists of corresponding phase vectors. The signal $s_{T4C}$(n,k,m) arises through complex-valued, first level Hilbert filtering from the real-valued signal $s_{T4}$(n,k,m), thus by weighted addition of the two values $s_{T4}$(n,k,m) and $s_{T4}$(n−1,k,m). This filtering and the scalar produced determined from the filtered values may also be viewed as a single scalar product. Thus, the phase characteristic values may be determined directly via a scalar product from the real-valued signal $s_{T4}$(n,k,m); the one vector here consists of the signal $s_{T4}$(n,k,m) in the time interval under consideration plus the preceding value (the time interval under consideration is thus effectively extended by one point in time), whereas the other vector is substantially formed by way of the sum of phase vectors (the filter coefficients also being phase vectors), wherein it is sufficient to determine this parameter vector once in advance, since it is identical for all the frequency ramps.

It has been assumed above that the first level Hilbert filtering has its zero point always on the negative part of the nominal band center, i.e. at $-f_{TM}$=−11.8 MHz. In principle, the zero point could also be varied over the frequency ramp, such that it always lies on the negative part of the respective nominal frequency, and the parameter vectors of the scalar products calculated accordingly. The parameter vectors may also be approximated such that they always relate to the center frequency of the respective time interval; to this end, in each case this center frequency is used for the Hilbert filter and also for the phase vector of the frequency normalization (the square component in the phase vectors of the frequency normalization is omitted).

The case has hitherto been observed in which there are two time intervals per frequency ramp, one in the leading region and one in the trailing region; the frequency position error of the respective frequency ramp was established by comparing the phase characteristic values in the two intervals. It is however also possible to work with just one time interval per frequency ramp (for example at the end of each frequency ramp); the phase characteristic values are then compared over two successive frequency ramps, i.e. the phase characteristic value of the second ramp with that of the first ramp, the phase characteristic value of the third ramp with that of the second ramp, etc. In order in this way to determine the absolute error of the frequency position, it would be essential to know precisely the frequency profile between the frequency ramps which arises in the ideal case (i.e. without interference), so as to be able to take this into consideration in the case of frequency normalization from ramp to ramp (the precise frequency profile being required for the precise phase advance between two intervals). The actual appearance of the frequency profile, however, in particular in the event of a frequency return jump, is not generally known precisely, since it is dependent for example on the transient response of the PLL. The frequency profile between the frequency ramps is nonetheless always the same; therefore, a relative determination of the frequency position, i.e. determination of the change therein over the ramps, is possible—only a constant component remains indeterminate, which is not really critical for monitoring purposes, however, since only very major constant frequency position errors (which do not generally occur) would be critical and these can also be determined by other methods. Frequency normalization is then performed with the same phase vectors for each frequency ramp; i.e. the unknown but constant phase advance from ramp to ramp arising in the absence of interference is not taken into consideration. The phase characteristic value in the absence of interference will thus change by a constant value from ramp to ramp (precisely by this uncompensated constant phase advance); phase difference $\Delta\varphi_{TEmeas}$(k,m), determined as above by way of the phase characteristic values, between two successive time intervals i.e. two ramps, is thus constant in the absence of interference. If, however, there is a change in frequency position, the measured phase differences $\Delta\varphi_{TEmeas}$(k,m) vary; if the phase difference is scaled to the first value $\Delta\varphi_{TEmeas}$(0,1), i.e. the phase difference of the first and second ramps, the following is obtained for the measured frequency error $\Delta f_{Emeas}$(k,m), scaled to its first value $\Delta f_{Emeas}$(0,1):

$$\Delta f_{EmeasR}(k,m)=\Delta f_{Emeas}(k,m)-\Delta f_{Emeas}(0,1)=(\Delta\varphi_{TEmeas}(k,m)-\Delta\varphi_{TEmeas}(0,1))\cdot T/(2\pi\cdot\Delta t_C),$$

wherein $\Delta t_C$=10 µs is the spacing of two frequency ramps. In this way, the change in phase angles has been determined over the frequency ramps, here based on the frequency position at the start of the ramp sequence. The relative error $\Delta f_{EmeasR}$(k,m) of the frequency position represents the average value between the respective two time intervals (which are located at the end of two successive ramps) and thus slightly leads the average error in the sampling period of the receive signal of the frequency ramp k,m. This could still be corrected by interpolation with the subsequent value, which is however negligible in the case of slow changes to the frequency position.

The advantage of this approach is that the time interval between the two time intervals taken into consideration is longer and thus the influence of the phase noise $\Delta\varphi_r$(k,m) generated for example by quantization effects of the A/D converter becomes less (the measurement error is $\Delta\varphi_r$(k,m)·T/(2π·$\Delta t_C$) and thus inversely proportional to the time period between the centers of the two time intervals). To reduce the measurement error further, the relative error $\Delta f_{EmeasR}$(k,m) may be filtered or the period between the two time intervals used may extend over all eight antenna combinations (just one frequency position error is thus established per index k, this being sufficient in the case of slow frequency drift for example due to transient thermal effects).

It should further be emphasized that if, to determine the relative frequency position, two time intervals from different frequency ramps are used, an identical frequency profile must in each case be present between the two time intervals (apart from the interference to be determined), i.e. the frequency generation setpoint setting must be the identical (i.e. for example the drive signal of a PLL). If, therefore, variable parameters are used in the frequency profile, this cannot arbitrarily varied; in the event of variation of the spacing of frequency ramps, one possible approach is to use a modified spacing only for every second frequency ramp, while the spacing has a fixed value for the other frequency ramps. The frequency position error is then only determined in each case from pairs with constant spacing; the pairs with varying spacing are not used, but rather the local error is interpolated from the two neighboring values.

The following should also be mentioned with regard to the above-described example using two time intervals each from one ramp: if during phase normalization the precise phase advance between the two time intervals is not taken into account, once again also only a relative change in frequency position is possible; the phase vectors for frequency normalization may then however have any desired start values in both time intervals, merely needing to be identical over all frequency ramps (for example the start phase has always to be zero).

It has hitherto been assumed that all transmit signals have the same nominal frequency position. There are however also applications in which the frequency position of the frequency ramps, i.e. the initial and thus synonymously the center frequency thereof, is deliberately varied over the transmit signals. This could in principle be considered in the case of frequency normalization; however, the deviation between the absolutely or relatively measured actual frequency position and the nominal frequency position may also be simply determined by difference formation.

Hereinafter, the further processing of a frequency position error $\Delta f_E(k,m)$ determined as above is explained (it should be noted that no further distinction is drawn between a measured frequency error $\Delta f_{Emeas}(k,m)$ and an actual frequency error $\Delta f_E(k,m)$, since sufficiently accurate determination is assumed).

One approach is to compensate the frequency position error $\Delta f_E(k,m)$. As a result of a changed frequency position, the phase angle of the received signal will change, since a modified number of wave packets passes in the path to the object and back. If for example the frequency position is thus increased by 1 MHz and the propagation time is 1 µs (object 150 m away), then precisely one more wave packet is fitted in, such that the phase changes by $2\pi$; the effect is proportional to the range r of the object and the change in frequency position $\Delta f_E(k,m)$. The phase position change $\Delta\varphi(k,m)$ of the receive signal thus results in general in $$\Delta\varphi(k,m)=2\pi\cdot\Delta f_E(k,m)/1\text{ MHz}\cdot r/150\text{ m}.$$

This phase shift remains after the first DFT (for range), i.e. the complex value of the power peaks at the range gate corresponding to the range r has this phase shift. To compensate, it is then simply possible to multiply by the complex unit vector with the phase $-\Delta\varphi(k,m)$. Since it is still not known after the first DFT in which range gates objects are located, multiplication is performed in all the range gates j (which have a length of 1 m) with the associated phase correction vector $$P_K(j,k,m)=\exp(-i\cdot2\pi\cdot\Delta f_E(k,m)/1\text{ MHz}\cdot j/150).$$

If, instead of the absolute frequency position error $\Delta f_E(k,m)$, the one which has merely been relatively determined is used, then all that has been compensated is the change in frequency position, which is generally sufficient. If the change in frequency position were not compensated, this would lead to distortion in the profile of the second DFT (for relative velocity); this is explained below.

A constant error in frequency position, i.e. a constant deviation in the center frequency of the frequency ramps from the nominal value thereof changes the average wavelength and thereby has an impact on the calculated relative velocity and angular position of objects (see derivations above). By using the real center frequency instead of the nominal center frequency, errors may be avoided; this is only required, however, in the case of major deviation, since only then do the resultant errors become significant (in the case of a center frequency varying over the frequency ramps, the impacts are significantly greater).

It should be noted that a filtered or smoothed frequency position error may also be used to calculate the phase correction vector $P_K(j,k,m)$ (for example smoothing of the measured frequency position error $\Delta f_E(k,m)$ by a regression curve).

If the frequency position errors $\Delta f_E(k,m)$ are not compensated, it is necessary to assess whether the influence thereof on detection quality is still of an acceptable degree, i.e. no unacceptable functional restrictions arise; otherwise, the relevant driver assistance functions and/or autonomous driving maneuvers must be restricted or disabled.

Figure 11:
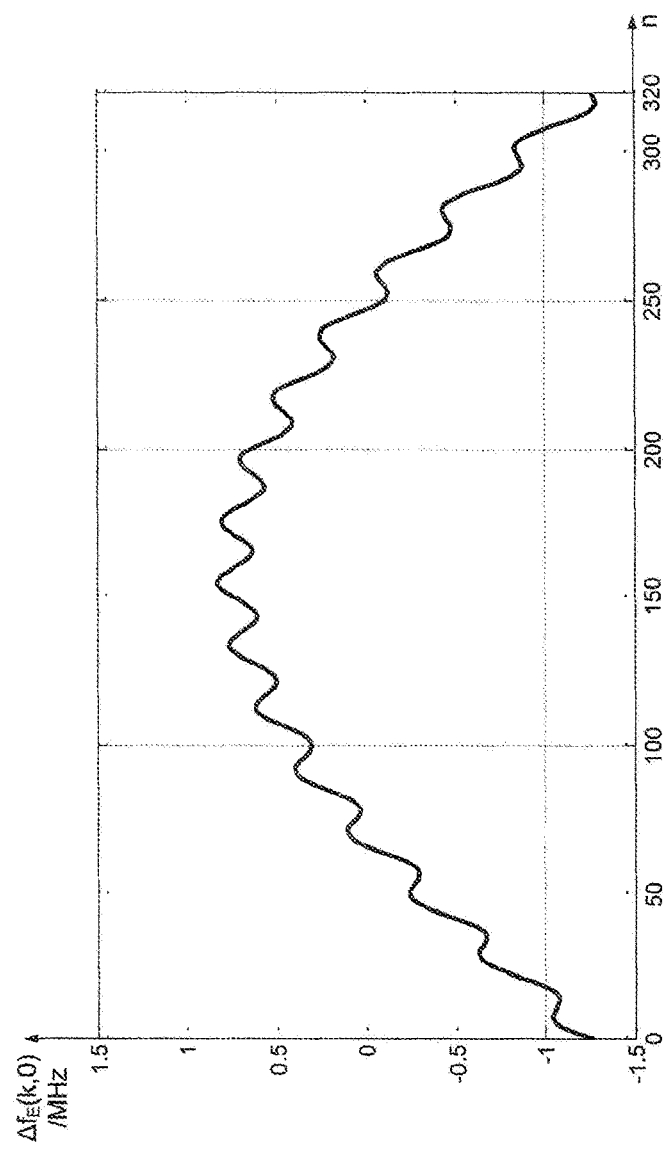
FIG. 11 shows the frequency position error $\Delta f_E(k,0)$ for an actual profile, which is curved relative to the nominal profile of the frequency position and additionally has a periodic disturbance, according to one exemplary embodiment.

By way of example, an actual profile of the frequency position is considered which is curved in relation to the constant nominal profile and furthermore has a periodic disturbance—FIG. 11 shows the corresponding frequency position error $\Delta f_E(k,0)$. To assess such deviations, a regression may be carried out (for example a 1st or 2nd degree polynomial regression) and the parameters of the compensation function (for example the polynomial) and/or the deviation, in particular the standard deviation, between actual profile and compensating function be used as the quality measure. However, these values merely give a rough indication of the impairment of detection quality (for the case under consideration here, the frequency position error being uncompensated).

For a more precise assessment, more in-depth analyses have to be carried out. An uncompensated frequency position error $\Delta f_E(k,m)$ has primary effects on the second DFT (for relative velocity), which is calculated in each range gate $j=0, \ldots, 99$ and each antenna combination $m=0, 1, \ldots, 7$ for the input values $e(j,k,m)$ extending over the frequency ramps $k=0, 1, \ldots, K-1$. For a target in the range gate j and with the relative velocity $v_{rel}$, the following applies:

$$e(j,k,m)=w(k)\cdot\exp(i\cdot2\pi\cdot(k\cdot v_{rel}/280\text{ km/h}+\Delta f_E(k,m)/1\text{ MHz}\cdot j/150)),$$

wherein w(k) represents the window function used for the second DFT and the amplitude is accepted as 1 and the starting frequency as zero, since this does not play any part in the further consideration; the first phase component describes the linear phase change through the relative velocity $v_{rel}$, the second phase component represents the influence of the uncompensated frequency position error $\Delta f_E(k,m)$ and results from the above derivative of the phase correction values.

For a target with a vanishing relative velocity (i.e. $v_{rel}=0$), the input signal of the second DFT then results in $$e(j,k,m)=w(k)\cdot\exp(i\cdot2\pi\cdot\Delta f_E(k,m)/1\text{ MHz}\cdot j/150);$$

without frequency position error $\Delta f_E(k,m)$ it would correspond to window function w(k).

From the above relationship it is apparent that the frequency position error has a greater impact, the higher is the range gate index j, i.e. the greater is the range. Therefore, the range of maximum interest r=99 m, i.e. j=99 is considered:

$$e(99,k,m)=w(k)\cdot\exp(i\cdot2\pi\cdot\Delta f_E(k,m)/1.485\text{ MHz}).$$

Figure 12A:
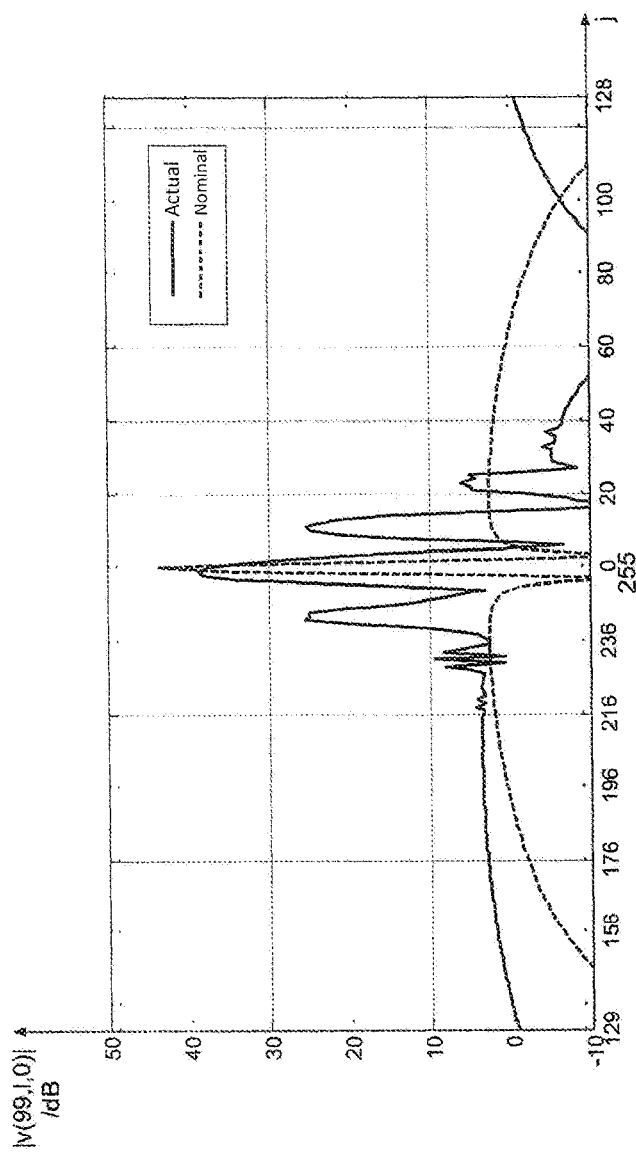
FIG. 12a shows, in a logarithmic representation (i.e., in dB) of the actual frequency position, the magnitude of the velocity spectrum v(99,1,0) (continuous line) and the magnitude of the velocity spectrum which results in the event of the nominal profile of the frequency position for a target at the same range r=99 m and with the same amplitude (dashed curve)

For the frequency position error $\Delta f_E(k,0)$ according to FIG. 11, FIG. 12a shows the velocity spectrum v(99,1,0) then resulting after DFT in terms of magnitude (continuous line; logarithmic depiction, thus in dB), wherein the index 1 represents the relative velocity gates. For comparison, FIG. 12a also shows the velocity spectrum which results in the case of the nominal frequency profile for a target with the same amplitude, the same range and the same $v_{rel}=0$ (dashed curve; DFT is the window function w(k)). Due to the curvature in the actual profile of the frequency position, not only does a small shift arise but also a broadening of the power peaks belonging to the target around l=0, which may for example lead to smaller targets in the environment of a large one no longer being detectable (if they are at the same range and approximately the same angle, since they can otherwise be separated using these variables). The "rounding" of the power into a broader power peak also leads to a reduction in level, such that detection sensitivity decreases, which may result in smaller objects at a greater range no longer being generally detectable. The additional smaller power peaks at l=11 and l=243 are produced by the periodic disturbance of the frequency position; this is particularly critical since a real object may thereby produce ghost objects at the same range with different relative velocity, which may result in heavy braking (if a ghost object appears to have a slower velocity).

Figure 12B:
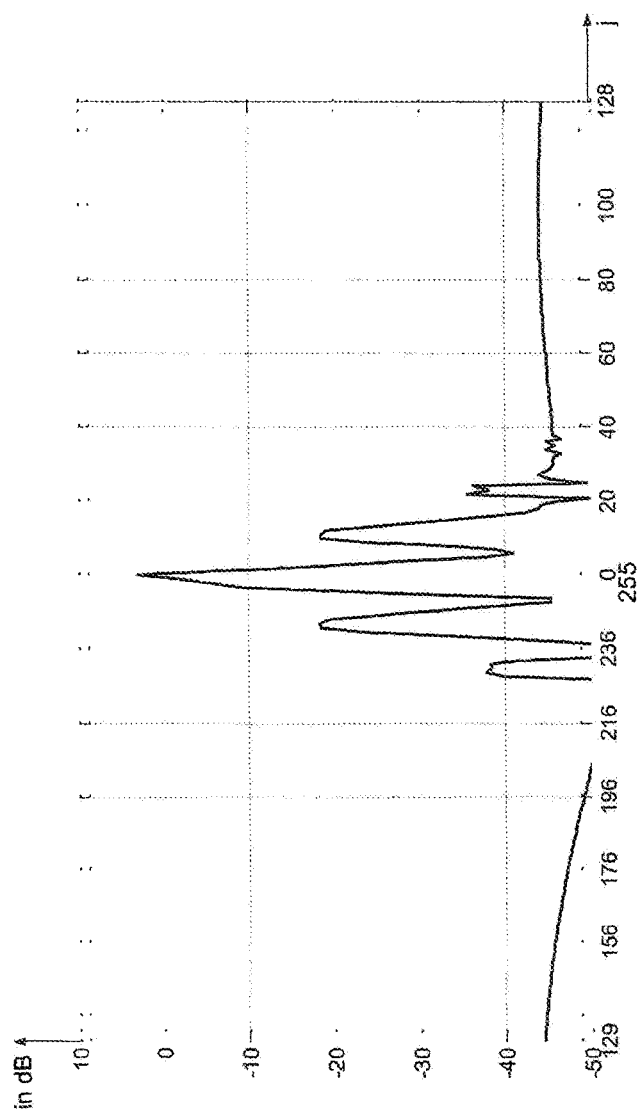
FIG. 12b shows the relative differential magnitude of these two velocity spectra.

To assess the quality of the frequency position, the velocity spectra v(99,l,m) calculated for the actual frequency position may for example be checked in terms of magnitude for a limit curve; alternatively, the magnitude of the difference between the velocity spectra relating to the actual and nominal frequency positions may also be checked for a limit curve. FIG. 12b shows the difference of the velocity spectra for the above example, wherein it is normalized to the maximum of the velocity spectrum for the nominal frequency position and plotted in dB; through normalization to the maximum of the velocity spectrum for the nominal frequency position, the difference may also be known as relative difference. Checking for a limit curve constitutes a binary quality measure (i.e. with the two results good or bad); alternatively, an analog quality measure may also be defined, e.g. the maximum relative difference between the velocity spectra for the actual and nominal frequency positions.

In the example according to FIG. 11 and FIG. 12, a periodic error in the frequency position results in additional smaller power peaks around the actual object, which may lead to ghost objects at the same range as the real object. If it is known from an analysis of the actual frequency position how high such disturbance lines are or may be, it may then be checked for each detection whether it has or could have arisen through an erroneous frequency position from another detection at the same range, and this detection may then be optionally be wholly discarded or identified as a potential apparent detection.

In the case of the considerations hitherto, the frequency position was monitored during the actual transmit signals (i.e. for the transmit signals whose associated receive signals are evaluated for environment detection). In order to save on the additional A/D converter for digitization of the divided-down oscillator signal, the A/D converter used for sampling of the receive signals could also be used for this purpose. Then monitoring of the frequency position could not, however, take place in parallel with environment detection; i.e. a further sequence of transmit signals with the same frequency profile would be introduced solely for monitoring the frequency position—monitoring of the frequency position and environment detection would then take place at different frequency ramps, which are arranged either in two sequentially successive blocks or preferably by nesting in one another. For the ramps used for monitoring frequency position, the transmission power could also be switched off (to save power and provided this does not have any influence on the frequency position error).

The case has hitherto been observed of an A/D converter being used for digitization of the frequency-reduced oscillator signal; now a counter will be used instead in the circuit block 1.12 of FIG. 1. In this case, the oscillator signal is divided down in the circuit block 1.11 merely by the factor T=4, such that the center frequency is $f_T$=6.04 GHz. The value of the counter is incremented by 1 at each positive edge of the divided-down rectangular signal; the counter thus counts the number of periods of the divided-down signal. The counter is not reinitialized at the start of each frequency ramp but rather simply keeps on counting, even between the frequency ramps—it may thus be described as a free-running counter which manages without intermediate initialization.

At each of the eight µs-long K=256 frequency ramps (k=0, 1, . . . , K−1) of each of the eight antenna combinations (m=0, 1, . . . , 7) the counter is read out at two respectively identical points in time, for example at $t_1$=1.6 µs and $t_2$=8 µs after the ramp start (and thus at the beginning and end of the sampling period of the receive signals); the two read-out counter values are denoted $z_1(k,m)$ and $z_2(k,m)$. The difference $\Delta z(k,m)$ of the two counter values is then formed (for which reason the absolute counter reading is not relevant, i.e. no reinitialization is needed at ramp start):

$$\Delta z(k,m) = z_2(k,m) - z_1(k,m).$$

The counter difference indicates for the signal divided down by the factor T=4 the number of periods in the time interval $[t_1,t_2]$; the oscillator signal has more periods in this time interval than factor T=4. The average frequency may be calculated from the number of periods divided by the length of the time interval:

$$f_M(k,m) = 4 \cdot \Delta z(k,m)/(t_2 - t_1).$$

The frequency position error results as a deviation of this center frequency determined by measurement and the nominal value thereof. The maximum measurement error of the counter amounts to one period relative to the divided-down signal; relative to the frequency position of the oscillator this then means a maximum error of $4/(t_2-t_1)$=625 kHz. To reduce the measurement error, the counter value from two points in time may also be compared again, these points in time being located in different frequency ramps (measurement error is inversely proportional to the spacing of the two read-out times). In general, the approaches which have been explained in detail above for digitization with an A/D converter may here be applied mutatis mutandis.

It should also be mentioned that real counters are limited in length, i.e. in their maximum counter reading and overrun may thereby occur—they thus reach the maximum counter reading and then jump back to 0 with the next edge to be counted. This corresponds to a modulo calculation; if the evaluations of the counter, i.e. the difference formation, are also performed in modulo calculation, the result is not distorted by overrunning provided the number of periods to be counted between the two points in time $t_1$ and $t_2$ does not exceed the counter length (i.e. the maximum counter reading): in the case of a time difference $t_2-t_1$=6.4 µs a 16 bit-long counter is sufficient. If the counter is shorter, the center frequency can no longer be uniquely measured. Since, however, only the deviation from a known nominal value and/or the change over the frequency ramps is to be measured, uniqueness in the MHz domain is sufficient; an 8 bit-long counter is sufficient for a uniqueness domain of 160 MHz.

As is apparent from the above derivatives, the accuracy of the measurement decreases as the division ratio T increases. On the other hand, the counter has to be faster, the less the frequency is divided down—a rapid counter is however complex to implement in a circuit and requires a lot of power. Frequency mixing may circumvent this problem, since it does not have any effect on measuring accuracy; however, the production of a second signal in the 24 GHz domain is costly. A combination of dividing and mixing may therefore also be implemented. To this end, the oscillator signal may for example initially be divided by a factor of 4 to the domain of around 6.04 GHz and then mixed-down with a fixed frequency of 5.8 GHz, such that the counter has only to continue to operate in the domain of around 200 MHz.

A further approach to reducing the division factor T is a counter which counts both the positive and the negative edges of the divided-down signal.

Finally, the advantages and disadvantages of the two above-described methods for digitizing the frequency-reduced oscillator signal should also briefly be discussed. Compared with the counter approach, A/D conversion has the advantage of being capable of operating with relatively large frequency division factors, since it is in principle capable of measuring frequencies or phases more accurately (at identical input signal frequencies). An A/D converter is however generally more costly to implement for this purpose than a counter (at identical input signal frequencies), and evaluation of the A/D converter values is more complex than that of the counter values.

It should be noted that the considerations and embodiments described with reference to the above examples may be applied to general dimensions and parameter designs, i.e. they may also be applied to other numerical values. For example, the approaches according to the invention may accordingly also be applied to a radar in the 77 GHz domain.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of controlling a radar system, the method comprising:
    generating a sequence of $K_0$ ($K_0>1$) transmission-frequency-modulated transmit signals, each transmission-frequency-modulated transmit signal among the $K_0$ transmission-frequency-modulated transmit signals having a same nominal frequency profile, apart from a variation in frequency position;
    determining a deviation of a frequency position of a transmission-frequency-modulated transmit signal among the $K_0$ transmission-frequency-modulated transmit signals from a nominal profile of a frequency position of the $K_0$ transmission-frequency-modulated transmit signals; and
    correcting frequency modulation of an oscillator of the radar system for generating the $K_0$ transmission-frequency-modulated transmit signals based on the deviation of the frequency position of the transmission-frequency-modulated transmit signal from the nominal profile of the frequency position of the $K_0$ transmission-frequency-modulated transmit signal.

2. The method according to claim 1, wherein determining the deviation of the frequency position of the transmission-frequency-modulated transmit signal from the nominal profile of the frequency position of the $K_0$ transmission-frequency-modulated transmit signals comprises:
    generating a low-frequency signal reduced in frequency relative to the transmission-frequency-modulated transmit signal by frequency division by a division factor and/or by mixing;
    filtering and sampling the low-frequency signal;
    determining a complex value after further filtering of the low-frequency signal in one or more time intervals, and
    wherein the correcting the frequency modulation of the oscillator of the radar system comprises:
        correcting sampled values of the one or more time intervals at least approximately by an expected phase advance, which results from the nominal frequency profile of the frequency position of the $K_0$ transmission-frequency-modulated transmit signals; and
        accumulating phase-corrected sampled values per interval among the one or more time intervals,
    wherein the one or more time intervals have at least approximately a same position over the $K_0$ transmission-frequency-modulated transmit signals, and
    wherein the nominal profile of the frequency position of the $K_0$ transmission-frequency-modulated transmit signals is characterized by the complex value on the basis of a phase angle of the complex value.

3. The method according to claim 2, wherein the filtering and sampling the low frequency signal comprises:
    converting the low-frequency signal at least approximately into an analytical signal; and
    applying first level Hilbert filters with a zero point at about a negative or a positive of a respective center frequency.

4. The method according to claim 3, wherein applying the first level Hilbert filters comprises accumulating the phase-corrected sampled values over the one or more time intervals by a scalar product between the low-frequency signal and a parameter vector.

5. The method according to claim 2, determining the deviation of the frequency position of the transmission-frequency-modulated transmit signal from the nominal profile of the frequency position of the $K_0$ transmission-frequency-modulated transmit signals comprises:
    generating a phase difference between pairs of complex values,
    wherein the complex values belong to time intervals of similar positions over the $K_0$ transmission-frequency-modulated transmit signals and a same time period and a same frequency profile is at least approximately present between the time intervals, and
    wherein the deviation of the frequency position of the transmission-frequency-modulated transmit signal from the nominal profile of the frequency position of the $K_0$ transmission-frequency-modulated transmit signals is determined absolutely or relatively from the phase difference.

6. The method according to claim 5, wherein the phase difference is formed from a same transmission-frequency-modulated transmit signal among the $K_0$ transmission-frequency-modulated transmit signals.

7. The method according to claim 5, wherein the phase difference is formed from different transmission-frequency-modulated transmit signals among the $K_0$ transmission-frequency-modulated transmit signals.

\* \* \* \* \*